United States Patent
Schmitt et al.

(10) Patent No.: US 11,266,165 B2
(45) Date of Patent: Mar. 8, 2022

(54) METHOD OF PRODUCING A FOOD OR BEVERAGE PRODUCT WITH FREE DIVALENT CATIONS DAIRY AND PLANT PROTEIN AGGREGATION

(71) Applicant: SOCIETE DES PRODUITS NESTLE S.A., Vevey (CH)

(72) Inventors: Christophe Joseph Etienne Schmitt, Servion (CH); Giulia Marchesini, Bern (CH); Sandra Catharina Wilde, Wichtrach (CH); Eric Stanislas Kolodziejczyk, Vevey (CH); Coline Philip, Saint-Sebastien de Morsent (FR)

(73) Assignee: Societe des Produits Nestle S.A., Vevey (CH)

( * ) Notice: Subject to any disclaimer, the term of this patent is extended or adjusted under 35 U.S.C. 154(b) by 35 days.

(21) Appl. No.: 16/617,661

(22) PCT Filed: Jun. 1, 2018

(86) PCT No.: PCT/EP2018/064495
§ 371 (c)(1),
(2) Date: Nov. 27, 2019

(87) PCT Pub. No.: WO2018/220188
PCT Pub. Date: Dec. 6, 2018

(65) Prior Publication Data
US 2020/0178563 A1 Jun. 11, 2020

(30) Foreign Application Priority Data
Jun. 1, 2017 (EP) .................................... 17174035

(51) Int. Cl.
A23J 3/10 (2006.01)
A23L 33/19 (2016.01)
(Continued)

(52) U.S. Cl.
CPC .................. *A23J 3/10* (2013.01); *A23C 21/04* (2013.01); *A23C 21/06* (2013.01); *A23C 21/10* (2013.01);
(Continued)

(58) Field of Classification Search
CPC .... A23J 3/10; A23J 1/006; A23J 1/202; A23J 1/205; A23J 1/22; A23J 3/16;
(Continued)

(56) References Cited

U.S. PATENT DOCUMENTS

2009/0117231 A1* 5/2009 Murray .................... A23J 3/16
426/74
2019/0364917 A1 12/2019 Sher et al.
(Continued)

FOREIGN PATENT DOCUMENTS

RU 2015104041 A 8/2016
WO 2016102500 6/2016
(Continued)

OTHER PUBLICATIONS

Mession et al. (2015), "Interactions in casein micelle—Pea protein system (part i): Heat-induced denaturation and aggregation" Food Hydrocolloids, 2017, vol. 67, pp. 229-242 (Available online Dec. 22, 2015). (Year: 2015).*
(Continued)

*Primary Examiner* — Brent T O'Hern
(74) *Attorney, Agent, or Firm* — K&L Gates LLP

(57) ABSTRACT

The invention relates to a method of producing a food or beverage product, comprising the steps of: providing an ingredient composition comprising micellar caseins, whey protein and plant protein having a pH of 5.9-7.1, preferably 6.2-6.8, and having a concentration of 1 to 15 wt. % of total proteins, and wherein the composition has a micellar casein to whey protein ratio of, 90/10 to 60/40 and a micellar
(Continued)

caseins and whey protein to plant protein ratio of 80/20 to 20/80, adding divalent cations to provide a concentration of 2.0-10 mM free divalent cations in the ingredient composition and subsequently heat treating the ingredient composition to form agglomerated proteins comprising micellar casein, whey protein and plant proteins, the agglomerates having a size of 5 to 50 microns as measured by D(4,3) mean diameter as measured by laser diffraction. The invention also relates to a product obtained by this method.

18 Claims, 10 Drawing Sheets

(51) Int. Cl.
| | | |
|---|---|---|
| A23L 33/185 | (2016.01) | |
| A23C 21/04 | (2006.01) | |
| A23C 21/06 | (2006.01) | |
| A23C 21/10 | (2006.01) | |
| A23J 1/00 | (2006.01) | |
| A23J 1/20 | (2006.01) | |
| A23J 1/22 | (2006.01) | |
| A23J 3/16 | (2006.01) | |
| A23L 2/66 | (2006.01) | |

(52) U.S. Cl.
CPC ............... *A23J 1/006* (2013.01); *A23J 1/202* (2013.01); *A23J 1/205* (2013.01); *A23J 1/22* (2013.01); *A23J 3/16* (2013.01); *A23L 2/66* (2013.01); *A23L 33/185* (2016.08); *A23L 33/19* (2016.08)

(58) Field of Classification Search
CPC .......... A23L 33/19; A23L 33/185; A23L 2/66; A23C 21/04; A23C 21/06; A23C 21/10
USPC .......................................................... 426/656
See application file for complete search history.

(56) References Cited

U.S. PATENT DOCUMENTS

2019/0373907 A1   12/2019   Schmitt et al.
2020/0037632 A1    2/2020   Schmitt et al.

FOREIGN PATENT DOCUMENTS

WO        2016102503 A1    6/2016
WO        2017021428       2/2017

OTHER PUBLICATIONS

Message et al. "Interactions in casein micelle—Pea protein system (part I): Heat-induced denaturation and aggregation" Food Hydrocolloids, 2017, vol. 67, pp. 229-242.

Beliciu et al. "The effect of protein concentration and heat treatment temperature on micellar casein-soy protein mixtures" Food Hydrocolloids, 2011, vol. 25, No. 6, pp. 1448-1460.

Russia Patent Office Communication for Application No. 2019142721, dated Oct. 25, 2021, 13 pages.

\* cited by examiner

METHOD OF PRODUCING A FOOD OR BEVERAGE PRODUCT WITH FREE DIVALENT CATIONS DAIRY AND PLANT PROTEIN AGGREGATION

CROSS REFERENCE TO RELATED APPLICATIONS

The present application is a National Stage of International Application No. PCT/EP2018/064495, filed on Jun. 1, 2018, which claims priority to European Patent Application No. 17174035.0, filed on Jun. 1, 2017, the entire contents of which are being incorporated herein by reference

FIELD OF THE INVENTION

The present invention relates to a method of producing a food or beverage product, in particular to a method for forming agglomerated proteins in an ingredient composition. The invention also relates food or beverage product comprising aggregated proteins comprising micellar caseins and whey proteins and plant protein aggregates.

BACKGROUND

It is known to provide texture and mouthfeel to food and beverage product by protein aggregation and there continue to be a need for food and beverages products exhibiting nutritional balance of macronutrients while delivering great taste and texture.

CN104489097A describes a process to obtain a heat convection drying protectant preparations for lactic bacteria or probiotics. It consisting in heat treating at 60° C. a milk preparation enriched with calcium in order to induce protein aggregation and subsequently submitting the preparation to a mechanical homogenization treatment.

WO07040113A describes the production of an ingredient exhibiting high content in milk-derived complex lipids. It is obtained by precipitating the protein fractions of butter serum at pH 4.0 to 5.0 in presence of calcium and filtering the supernatant in order to concentrate the complex lipids.

WO 06065135 A2 disclosing the production of a free divalent cations-rich liquid food product in which 20% of the lysine residues carried out by the proteins have been glycosylated in order to increase their resistance to aggregation in presence of calcium. Therefore, WO 06065135 A2 is related to preventing protein aggregation in presence of divalent cations, calcium among others.

US20130011515 A1 is describing a process for the production of a milk protein concentrate which is enriched with whey proteins. Skimmed milk is heated in the pH range 6.5-7.0 in order to promote aggregation of whey proteins together with caseins. The heated product is subsequently submitted to filtration in order to concentrate protein aggregates and to remove lactose.

D. L. Van Hekken et al. [Rheology and Microstructure of Chemically Superphosphorylated Whole Casein, 1997, J. Dairy Sci. 80 2740-2750.] describe the effect of addition of free calcium on the viscosity of superphosphorylated caseins. It was shown that the viscosity of a 4 wt % superphosporylated caseins (190% phosphorylation) increased by addition of 30 mM calcium at pH 8.4. This study does not relate to mixes of plant and dairy proteins. Further, for mixes of plant and dairy proteins the superphosporylated caseins are not desirable as chemically modified and expensive ingredient.

C. Holt described in his paper [An equilibrium thermodynamic model of the sequestration of calcium phosphate by casein micelles and its application to the calculation of the partition of salts in milk, 2004, Eur. J. Phys., 33, 421-434] reported that the amount of free calcium ions in bovine milk at pH 6.70 was 10.2 mM and that this value decreased to 8 mM when milk pH decreased to 6.0. This paper is not concerned with plant proteins.

I. R. McKinnon et al. [Diffusing-wave spectroscopy investigation of heated reconstituted skim milks containing calcium chloride, 2009, Food Hydrocolloids, 1127-1133] investigated the effect of calcium chloride addition to skimmed milk reconstituted at 10 wt % in the pH range 6.0 to 7.2 and the subsequent effect on viscosity when the milks were heated for 10 minutes at 60, 75 and 90° C. They reported a critical instability pH of 5.9 for the milks upon heating at 90° C. for calcium chloride content up to 10 mM. This paper is not concerned with plant proteins.

L. Ramasubramanian et al. [The rheological properties of calcium-induced milk gels, 2014, J. Food Engineering, 45-51] determined the impact of calcium chloride addition into full fat milk (3.5% fat) upon heating at 70° C. It was reported that calcium chloride addition below 12.5 mM was leading to viscous dispersions while higher calcium chloride concentrations induced formation of stronger gels. Interestingly, pre-treatment of the milk at 90° C. for 10 minutes before calcium chloride addition and subsequent heating at 70° C. was leading to the strongest gels. Gel formation is not desirable in many semi-solid food and beverage products. This paper is not concerned with plant proteins.

T. Phan-Xuan et al. [Tuning the structure of protein particles and gels with calcium or sodium ions. 2013, Biomacromolecules, 14, 6, 1980-1989.] reported when treating 100% whey protein (□-lactoglobulin) with an addition of calcium chloride to □-lactoglobulin at pH 7.0 it was leading to microgels or gel formation upon heating at 68 or 85° C. when calcium content was 5-6 mM for a protein concentration of 4 wt %. Again gel formation is not desirable in many semi-solid food and beverage products.

N. Chen et al. [Thermal aggregation and gelation of soy globulin at neutral pH. 2016, Food Hydrocolloids, 61, 740-746] have reported that soy protein isolate was forming fractal aggregates upon heating at neutral pH at temperatures ranging between 50 and 90° C. for protein concentrations ranging between 5 and 9 wt %. No impact of calcium on protein aggregation is described.

J. M. Franco et al. [Influence of pH and protein thermal treatment on the rheology of pea protein-stabilized oil-in-water emulsions. 2000, JAOCS, 77, 9, 975-984] reported that a concentrated 65 wt % sunflower emulsion stabilized by 6 wt % pea protein was exhibiting a viscosity increase upon heating at temperature above 70° C. for up to 60 min and that the highest viscosity increase was obtained at pH around the isoelectrical point of the pea proteins, i.e. pH 5.3.

The interaction between micellar casein and pea proteins has been described by J.-L. Mession et al. [Interactions on casein micelle-pea system (part 1): heat-induced denaturation and aggregation. 2017, Food Hydrocolloids, 67, 229-242.] Upon heating dispersions of micellar caseins and pea protein isolate between 40 and 85° C. at pH 7.1 for a weight mixing ratio of 1:1 and a protein content of 1.8 wt %. It was concluded that caseins were not involved in pea protein aggregation while they were contributing to the dissociation of pea protein subunits. This document does not disclose the effect of free calcium.

C. M. Beliciu and C. I. Moraru [The effect of protein concentration and heat treatment temperature on micellar casein-soy protein mixtures. 2011, Food Hydrocolloids, 25, 1448-1460] studied the effect of heating 1:1 micellar caseins and soy protein isolate at temperatures ranging from 40 to 90° C. for 15 minutes at pH 7.0 for protein content ranging from 2 to 15 wt %. They found that the flow properties of the mixtures were lower than for the soy protein isolate at the same protein concentration. In addition, authors claimed that calcium was precipitating out of solution and did not contribute to the overall charge of the aggregates, nor to texture/viscosity.

The prior art teaching shows that although viscosity increase may be obtained with calcium addition in milk products, it is not disclosed that a viscosity increase of mixes of dairy/plant proteins may be obtained. It is also well known from the prior art that gelling effect may be undesirable in food production. Furthermore, the pH of the product may vary and influence process however may lead to instability of the product. The prior art does not show how to provide food and beverage products delivering desirable taste and texture.

Thus, there is a need for food and beverages products exhibiting nutritional balance of macronutrients while delivering great taste and texture.

OBJECT OF THE INVENTION

It is the object of present invention to provide a food or dairy/plant protein product with improved texture and mouthfeel.

SUMMARY OF THE INVENTION

The present invention provides the improvement by the use of milk/plant protein-based aggregates by specific heat treatment in the presence of a specific concentration of added divalent cations.

In a first aspect, the invention relates to a method of producing a food or beverage product, comprising the steps of:
providing an ingredient composition comprising micellar caseins, whey protein and plant protein having a pH of 5.9-7.1, preferably 6.2-6.8, and having a concentration of 1 to 15 wt. % of total proteins, and wherein the composition has a micellar casein to whey protein ratio of from 90/10 to 60/40 and
a micellar caseins and whey protein to plant protein ratio of 80/20 to 20/80,
adding divalent cations to provide a concentration of 2.0-10 mM free divalent cations in the ingredient composition
and subsequently
heat treating the ingredient composition to form agglomerated proteins comprising micellar casein, whey protein and plant proteins, the agglomerates having a size of 5 to 50 microns as measured by D(4,3) mean diameter as measured by laser diffraction.

The present invention uses milk/plant protein-based aggregates that are generated upon heat treatment in presence of added-free divalent cations in order deliver optimum sensorial properties while allowing a reduction of the total fat content in the product. In addition, the described invention enables formulation of dairy-based texturized products without the use of additional stabilizers or hydrocolloids.

In preferred method of the invention the heat treatments the ingredient composition is subject to a temperature of 80°-125° C. for a period of 30-900 s or at a temperature of 126° C. or above for 3-45 s. In a more preferred embodiment of the invention the ingredient composition is subjected to a temperature of 80°-100° C. for a period of 0.5-4 min or a UHT (Ultra high temperature) heat treatment above 135° C. for 3 to 45 s.

A method according to claim 1, wherein the ingredient composition is heat treated at a temperature of 80°-125° C. for a period of 30-900 s or at a temperature of 126° C. or above for 3-45 s.

In a second aspect the invention relates food or beverage product obtained by a method described above.

In a further aspect the invention relates to a food or beverage product comprising aggregated proteins comprising micellar casein, whey and plant protein aggregates, wherein the product has a pH of 5.9-7.1, preferably 6.2-6.8, and having a concentration of 1 to 15 wt. % of total proteins, and wherein the composition has a micellar casein to whey protein ratio of, 90/10 to 60/40 and a micellar caseins and whey protein to plant protein ratio of 80/20 to 20/80, a concentration of 2.0-10 mM free divalent cations in the ingredient composition, agglomerated proteins comprising casein, whey protein and plant proteins, the agglomerates having a size of 5 to 50 microns as measured by $D_{(4,3)}$ mean diameter as measured by as measured by laser diffraction.

DETAILED DESCRIPTION OF THE INVENTION

Figure 1:
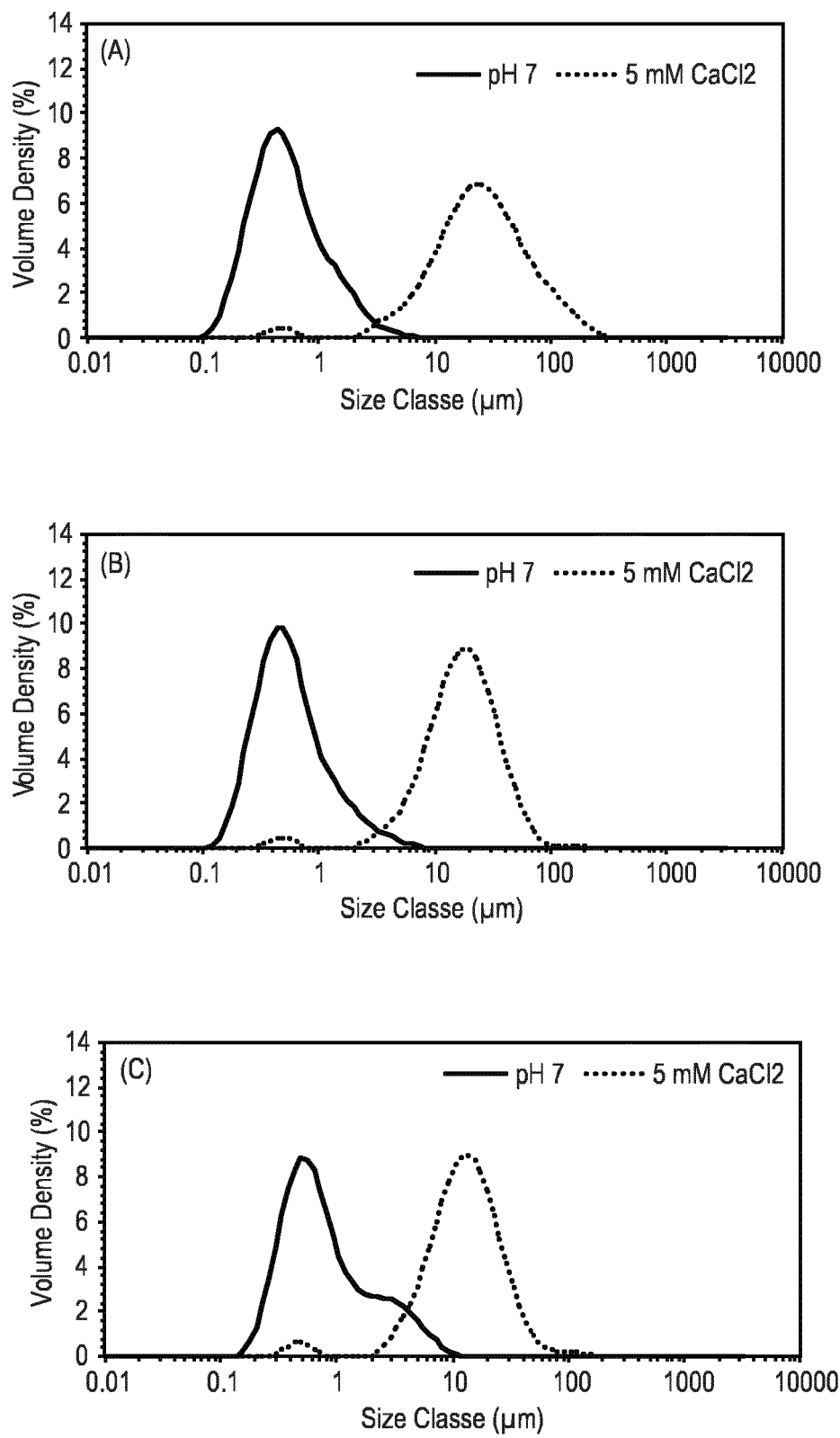
FIG. 1 shows particle size distributions of high oleic sunflower based emulsions stabilized by milk protein concentrate (MPC)/soy protein isolate (SPI) at a total protein content of 3 wt % and a mixing ratio 75/25 after heating (95° C., 15 min) and shearing at pH 7.0 in the presence or absence of 5 mM $CaCl_2$. (A) 2.5 wt % sunflower oil, (B) 5 wt % sunflower oil, (C) 10 wt % sunflower oil. Full line: pH 7.0 without $CaCl_2$ added; dashed line: pH 7.0 with 5 mM $CaCl_2$ added.

When carrying out experiments on the effect of divalent cations addition, in particular calcium, to mixes of dairy/plant proteins on protein aggregation and viscosity built up, it was surprisingly found that there is a critical range of divalent cations addition leading to optimum protein aggregation without precipitation or gelation of the formed aggregates upon heating. When this optimum concentration of calcium is passed, the system either exhibited over-aggregation with precipitation or a decrease of aggregate size.

Without being bound to theory, it is likely that calcium chloride addition to proteins is leading to an exchange between the protons adsorbed at the surface of the proteins and the calcium ions which have a higher affinity. This phenomenon resulted in a decrease of the pH of the dispersion and thereby a decrease of electrostatic repulsions between proteins. In these conditions, subsequent heat treatment of dairy/plant protein based dispersions and emulsions is leading to a controlled aggregation of the proteins which was shown to affect positively the textural and sensorial properties of the finished products.

A major advantage of this invention is that it allows to texturize reduced fat dairy/plant protein based systems and enables a reduction of the use of additional hydrocolloids.

In the present context the agglomerates created with the method according to the invention and present in the product of the invention have a size of 5 to 50 microns as measured by D(4,3) mean diameter. The agglomerate particle size distribution is measured (PSD) using Mastersizer 2000 (Malvern Instruments, UK) or an equivalent measurement system. For the measurements a sample may e.g. be dispersed in the Hydro SM measuring cell until an obscuration rate of 9-10% is obtained and then analysed in the Mastersizer.

Further in the present context the free divalent cations may be measured by means of a selective electrode. For example, free (ionic) calcium concentration is determined a Mettler Toledo calcium selective electrode perfection™ DX series half cells with BNC connector P/N 51344703 connected to a 692 pH/Ion meter (Metrohm Switzerland).

Further in the present context unless otherwise indicated % of a component means the % of weight based on the weight of the composition, i.e. weight/weight %.

Preferably the protein concentration in the ingredient composition is 1-10 wt. %, more preferably 2-9 wt. %.

In a preferred embodiment of the invention the aggregates are 10-40 microns, preferably 10-30 microns measured by D(4,3) mean diameter. This give a desirable mouth feel to the product without the aggregates providing grittiness.

In the present context plant protein may be selected from the group consisting of soy, pea, oat, potato, canola, peanut or rice.

In a preferred embodiment of the invention the plant protein is selected from the group consisting of pea protein, soy protein or a combination thereof. It has been found that these plant proteins provide a good texture to the products of the invention.

Advantageously in the method according to the invention, the solubility of the plant protein has been improved with physical treatment (e.g. heating, homogenization).

It is preferred that the method according to the invention the ingredient composition is subjected to homogenization. It has however been found that the agglomerates created in the method according to the invention may be destroyed if the agglomerates are subjected to too high shear. Advantageously, the homogenisation is before the heat treatment of the ingredient composition.

In accordance with the invention it is preferred that the divalent cations are selected from the group consisting of Ca or Mg cations or a combination thereof. These divalent cations are food grade and do not contribute for easy oxidation of oils or fats.

In a preferred embodiment of the invention the divalent cations are calcium cations.

Advantageously, the divalent cations, preferably calcium salt, are added to until the free divalent calcium cations concentration is 2.0-6.0 mM, preferably 2.0-4.0 mM, more preferably 2.0-3.0 mM.

In a preferred embodiment of the invention the plant protein is pea protein and calcium salt is is added to until the free divalent calcium cations concentration is 2.0-3.0 mM, preferably 2.0-2.5 mM. This embodiment of the invention has the advantage of not to lead to some sensory defects (metallic taste, soapiness) induced by the added salt.

the plant protein is pea protein and calcium salt is added to until the free divalent calcium cations concentration is 2.0-3.0 mM, preferably 2.0-2.5 mM.

In another preferred embodiment of the invention the plant protein is soy protein and calcium salt is added until the free divalent calcium cations concentration is 2.0-3.0 mM, preferably 2.0-3.0 mM. This embodiment of the invention has the advantage of not to lead to some sensory defects (metallic taste, soapiness) induced by the added salt.

The pH of the ingredient composition may be adjusted to 5.9-6.8 after adding the cations.

Furthermore, it is preferred that the divalent cations are added in form of a mineral salt. Preferably the mineral salt is calcium salt is selected from to the group consisting of calcium chloride, calcium hydroxide, calcium carbonate, calcium citrate, calcium phosphate, stearate malate, calcium glycerophosphate, calcium lactate, and calcium gluconate. In a particular preferred embodiment of the invention the calcium salt is calcium chloride or calcium lactate. In an all-natural embodiment of the invention the calcium is obtained from concentration minerals from milk after separation of the protein, fat and lactose by e.g. membrane fractionation.

The pH of the ingredient composition is preferably 6.2-7.1 before adding the calcium cations.

The content of soluble protein after the aggregation reaction in the ingredient composition is preferable below or equal to 30%, preferably below or equal to 20% in relation to the total protein content, showing that the majority of the proteins are embedded in the aggregated structures.

In one embodiment of the invention the ingredient composition comprises from 0 to 36 wt. % fat, preferably 1.0-20 wt. %, more preferably 3.0-15 wt. %, most preferably 5 to 10 wt. % of fat. It has been found that even with low amounts of fat the texture of the product is creamy due to the agglomeration created within the product.

The caseins and whey protein in the ingredient composition are preferably provided in a form selected from the group consisting of raw milk, pasteurized milk, low heat concentrated milk, low heat milk powder, milk protein concentrate, milk protein isolate in liquid or powder format or a combination thereof while the additional whey proteins are provided in a form selected from the group consisting of sweet dairy whey, whey protein concentrates, whey protein isolates in liquid, concentrate or powder format or a combination thereof.

The micellar casein may be obtained from the group consisting of milk, milk protein concentrate and milk protein isolate in a liquid or powder form or a combination thereof.

Preferably the whey protein source is non-denatured.

Plant proteins are preferably selected from powdered plant protein concentrates or isolates.

The caseins and whey protein in the ingredient composition are preferably provided in a form selected from the group consisting of raw milk, pasteurized milk, low heat concentrated milk, low heat milk powder, milk protein concentrate, milk protein isolate in liquid or powder format or a combination thereof while the additional whey proteins are provided in a form selected from the group consisting of sweet dairy whey, whey protein concentrates, whey protein isolates in liquid, concentrate or powder format or a combination thereof.

The micellar casein may be obtained from the group consisting of milk, milk protein concentrate and milk protein isolate in a liquid or powder form or a combination thereof.

The invention also relates to a dairy concentrate obtained by the above described method.

In a particular preferred embodiment of the invention the concentrate is dried into powder by means of freeze drying, spray drying or roller-drying.

Products according to the invention may be dairy based products such as ice cream or frozen confection, dairy concentrates or desserts, sauces etc. The product format includes frozen, ambient, chilled, liquid and powder.

EXAMPLES

By way of example and not limitation, the following examples are illustrative of various embodiments of the present invention.

Example 1

Milk Protein and Pea Protein Aggregates Obtained by Calcium Lactate Addition in Recombined Full Fat Milk and Pea Protein Isolates, where 75% of the Total Protein Content is Milk Protein and 25% is Pea Protein Material and Methods Skim milk powder (MSK) low heat was provided by Hochdorf (Switzerland) and pea protein isolate Nutralys XF was provided by Roquette (France).

Since the protein concentration of the pea protein isolate is higher than skimmed milk powder, total solids (TS) were adjusted by addition of maltodextrin DE 38-41 (Roquette, France), in order to achieve 13% TS, as an average full fat milk. Sunflower high oleic oil (Oleificio Sabo, Switzerland) has been used to replace milk fat.

At a 13% TS the system has been formulated with 3.3% total protein (2.5% milk protein, 0.8% pea protein) and 3.5% oil.

Table 1 shows the composition of the milk-pea system.

TABLE 1

| Main ingredients and exemplary recipe of a mixed 75:25 MSK-pea protein system 13% TS. | | | |
|---|---|---|---|
| Ingredient | TS (%) | Protein (%) | Quantity (%) 13% TS |
| MSK, low heat | 96.4 | 34.3 | 7.5 |
| Pea protein isolate | 93.0 | 85.9 | 1.0 |
| Sunflower, high oleic | 100.0 | | 3.5 |
| Maltodextrin, DE 38-41 | 95.7 | | 1.5 |
| Water | | | 86.5 |

For calcium addition, calcium lactate (Purac Biochem, the Netherlands) was dry mixed and added together with the maltodextrin during the process.

Figure 10:
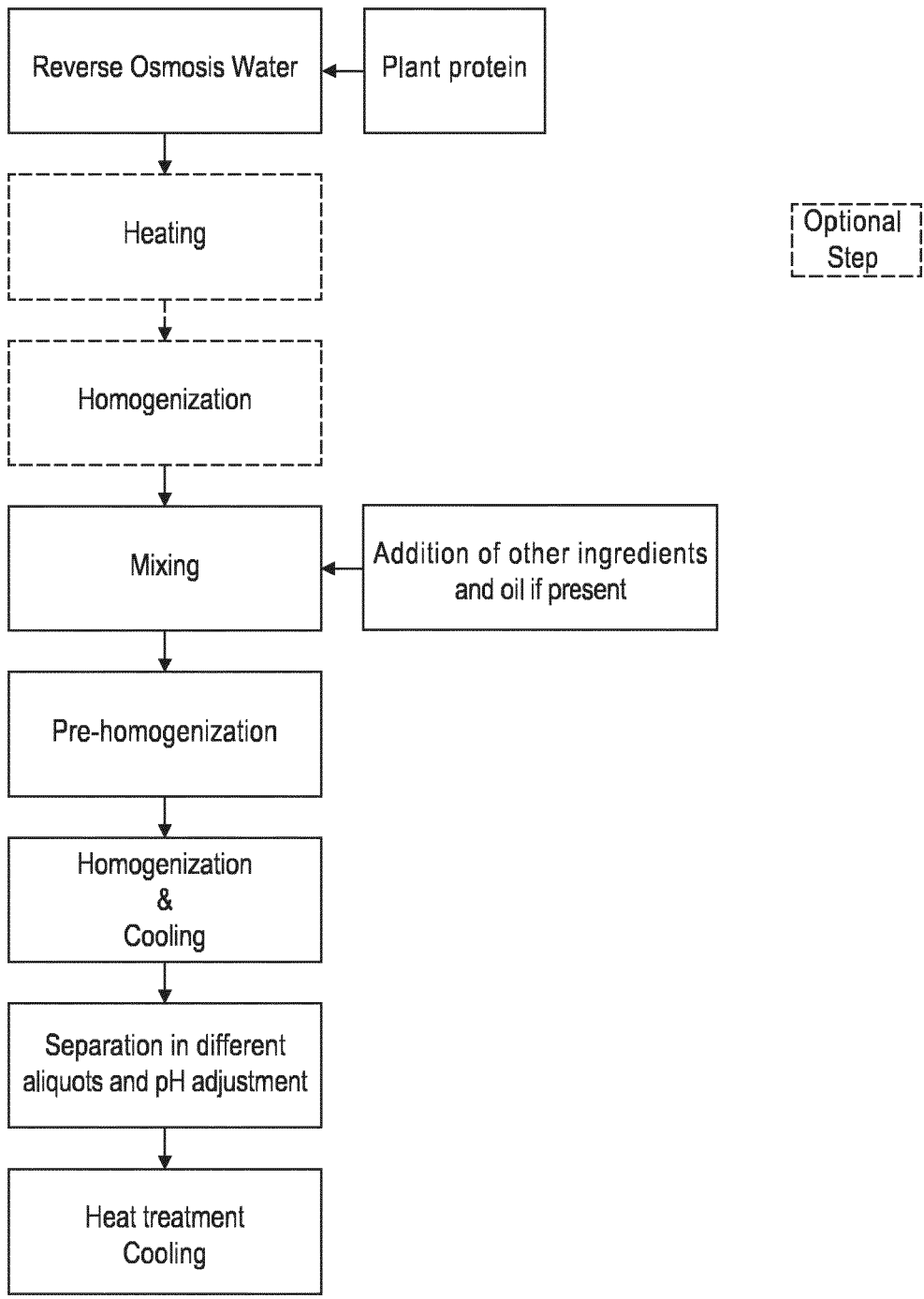
FIG. 10 shows the process used to formulate the milk-pea or the milk-soy systems.

FIG. 10 shows the process used to formulate the milk-pea systems.

To increase the solubility of pea protein, the pea protein has been added to reverse osmosis water at 55° C. and stirred for 30 minutes. The protein dispersion has been heated at 95° C. using a coiled tube (4 mm internal radius, 7 windings 94 mm diameter, 2100 cm length) immersed in an oil bath at 110° C. (HBR4 IKA, Germany). The flow rate was of 425 mL/min in order to make sure that at the exit of the coil the target temperature was reached. The heated dispersion was collected in a Schott bottle placed in a water bath at 95° C. (HBR4 IKA, Germany) and provided with a magnetic stirrer. The pea protein dispersion was stirred at 95° C. for 10 min, before being cooled in a cold water bath to 50° C. and subsequently homogenized at 200+50 bar in a bench top homogenizer Panda PLUS (GEA Niro Soavi, Italy).

The other ingredients (MSK, oil if present, maltodextrin and calcium salt) were added to the homogenized pea protein dispersion at 50° C. and the mixture was stirred 40 min at 50° C. A pre-emulsion has been obtained by means of an Ultra Turrax (T25 IKA, Germany) at 14000 rpm for 1 min.

The pre-homogenized mix has been subsequently homogenized at 200+50 bar at 50° C. and then cooled in an ice bath to 4° C. The mix has been divided in different aliquots and kept below 10° C. while the pH of each of them has been adjusted to the target value with a 5% w/w potassium hydroxide solution (Merck, Germany) or a 10% w/w citric acid solution (Jungbunzlauer, Austria).

After pH equilibration each emulsion has been preheated in a Schott bottle on a plate heater (rtc basic IKA, Germany) under continuous agitation. The pre-heated emulsion has been pumped at 115 mL/min through an heating coil (4 mm internal radius, 7 windings 94 mm diameter, 210 cm length) which was immersed in an oil bath at 110° C. (HBR4 IKA, Germany) in order to make sure that at the exit of the coil the target temperature was reached. The coil was connected to the holding tube (internal radius 7 mm, 3400 mm length) which was immersed in a water bath at 96° C. (HBR4 IKA, Germany). The connection between the coil and the water bath together with the holding tube provided a total heating time of 60 s at 96° C.

After heating, the sample was pumped through an additional coiled tube (4 mm internal radius, 4 windings 94 mm diameter, 120 cm length), immersed in ice water in order to be cooled to <50° C. in less than 30 s.

Flow Properties

With the non-heated and heated emulsions, flow experiments were performed using a controlled stress rheometer Haake Rheostress 6000 coupled with UMTC, (Thermo Scientific, Germany) equipped with a plate/plate geometry (60 mm diameter) and 1 mm gap.

Steady shear flow curves were determined at shear rates ranging from 0 to 300 1/s (linear increase) at a constant temperature of 25° C.+/−0.1. The apparent viscosity was recorded as a function of the shear rate.

Particle Size Distribution

In order to assess particles size distribution, non-heated and heated emulsions were analyzed by dynamic light scattering using a Malvern Mastersizer 2000 granulometer (Malvern Instruments, Ltd., UK). Ultra pure and gas free water used to disperse the liquid sample was prepared using Honeywell water pressure reducer (maximum deionised water pressure: 1 bar) and ERMA water degasser (to reduce the dissolved air in the deionised water).

Measurement settings used are a refractive index of 1.46 for fat droplets and 1.33 for water at an absorption of 0.01. All samples were measured at an obscuration rate of 2.0-2.5%. The measurement results are calculated in the Malvern software based on the Mie theory. The volume based mean diameter value D(4,3) is reported.

Ionic (Free Calcium) Determination

Ionic calcium concentration was measured using an Orion Ion Analyser EA940 calcium ion-sensitive electrode and pH/mV meter in mV mode (Thermo Orion, USA). Calcium ion concentration was calculated from the millivolt readings, based on a regression equation from a standard curve of mV readings for 1, 5, and 10 mM calcium standard solutions containing 80 mM KCl in order to standardize the ionic strength. These standards were prepared from a 0.1 M calcium chloride standard solution supplied by Thermo Fisher Scientific (USA) and a 4 M potassium chloride solution (Ionic strength Adjustor Calcium, Thermo Orion, USA).

Results

Table 2 shows the results obtained from the analysis of the samples prepared with milk-pea proteins (75:25—recipe in Table 1) with addition of 2.5 mM calcium lactate and adjusted at different pH.

| Added mineral | CaLac (mM) | Target pH | pH at 25° C. before heating | Free calcium (mM) | D (4, 3) (µm) before | D (4, 3) (µm) after | Viscosity (mPa·s at 100 1/s) before | Viscosity (mPa·s at 100 1/s) after |
|---|---|---|---|---|---|---|---|---|
| Yes | 2.25 | 6.4 | 6.34 | 2.1 | 2.804 | 13.924 | 4 | 11 |
| Yes | 2.25 | 6.3 | 6.30 | 2.3 | 1.252 | 13.887 | 5 | 11 |
| Yes | 2.25 | 6.2 | 6.17 | 2.5 | 1.645 | 17.537 | 7 | 15 |
| Yes | 2.25 | 6.1 | 6.06 | 2.8 | 2.629 | 45.966 | 9 | 26 |

Table 2 shows that by decreasing pH, the calcium in the system has been progressively released up to 2.8 mM at pH 6.06. It is possible to observe that both particle size and viscosity increased after heating the emulsions in presence of calcium lactate. The effect on viscosity increase is higher at lower pH.

Table 2 shows that by decreasing pH, the calcium in the system has been progressively released up to 2.8 mM at pH 6.06.It is possible to observe that both particle size and viscosity increased after heating the emulsions in presence of calcium lactate. The effect on viscosity increase is higher at lower pH.

When the pH has been further decreased to 5.84, the free calcium increased to 3.6, leading to the formation of very big aggregates (239.541 µm) losing any viscosity effect (3 mPa·s at 100 1/s). However, the system did not gel.

Example 2

Milk Protein and Pea Protein Aggregates Obtained by Calcium Lactate Addition in Double Concentrated Recombined Full Fat Milk, where 25% of the Milk Protein have been Substituted by Pea Proteins Skim milk powder (MSK) low heat was provided by Hochdorf (Switzerland) and pea protein isolate Nutralys XF was provided by Roquette (France).

Since the protein concentration of the pea protein isolate is higher than skimmed milk powder, total solids (TS) were adjusted by addition of maltodextrin DE 38-41 (Roquette, France), in order to achieve 13% TS, as an average full fat milk. Sunflower high oleic oil (Oleificio Sabo, Switzerland) has been used to replace milk fat.

At a 26% TS the system has been formulated with 6.6% total protein (4.95% milk protein, 1.65% pea protein) and 7% oil.

Table 1 shows the composition of the milk-pea system.

TABLE 3

Main ingredients and exemplary recipe of a mixed 75:25 MSK-pea protein system 26% TS.

| Ingredient | TS (%) | Protein (%) | Quantity (%) |
|---|---|---|---|
| | | | 26% TS |
| MSK, low heat | 96.4 | 34.3 | 15.0 |
| Pea protein isolate | 93.0 | 85.9 | 2.1 |
| Sunflower, high oleic | 100.0 | | 7.0 |
| Maltodextrin, DE 38-41 | 95.7 | | 3.0 |
| Water | | | 72.9 |

For calcium addition, calcium lactate (Purac Biochem, the Netherlands) was dry mixed and added together with the maltodextrin during the process.

FIG. 10 shows the process used to formulate the milk-pea systems.

The pea protein was pre-treated and the milk-pea system was formulated and processed as indicated in Example 1.

Flow Properties

With the non-heated and heated emulsions, flow experiments were performed as in Example 1.

Particle Size Distribution

The particles size distribution was analysed as in Example 1.

Ionic (Free Calcium) Determination

Ionic calcium concentration was measured as indicated in Example 1.

Results

TABLE 4

| Added mineral | CaLac (mM) | Target pH | pH at 25° C. before heating | Free calcium (mM) | D (4, 3) (μm) before | D (4, 3) (μm) after | Viscosity (mPa · s at 100 1/s) before | Viscosity (mPa · s at 100 1/s) after |
|---|---|---|---|---|---|---|---|---|
| Yes | 2.5 | 6.7 | 6.74 | 1.4 | 0.815 | 1.216 | 21 | 38 |
| Yes | 2.5 | 6.4 | 6.38 | 2.0 | 0.781 | 8.822 | 23 | 105 |
| Yes | 2.5 | 6.3 | 6.29 | 2.2 | 0.819 | 7.545 | 26 | 123 |
| Yes | 2.5 | 6.2 | 6.16 | 2.5 | 0.794 | 8.949 | 28 | 121 |
| Yes | 2.5 | 6.1 | 6.11 | 3.0 | 0.850 | 11.624 | 39 | 125 |

Table 4 shows that the emulsion with 2.5 mM calcium lactated added was characterized by a free calcium value of 1.4 mM at pH 6.7, which does not induce a significant protein aggregation during heat treatment. With decreasing pH, the calcium in the system has been progressively released up to 3.0 mM at pH 6.11. It is possible to observe that both particle size and viscosity increased after heating the emulsions in presence of calcium lactate and at a free calcium concentration of 2.0 mM or above. The effect on viscosity increase is higher at lower pH and thus higher free calcium concentration.

Example 3

Milk Protein and Pea Protein Aggregates Obtained by Calcium Lactate Addition in Double Concentrated Recombined Reduced Fat Milk, where 25% of the Milk Protein have been Substituted by Pea Proteins Skim milk powder (MSK) low heat was provided by Hochdorf (Switzerland) and pea protein isolate Nutralys XF was provided by Roquette (France).

Since the protein concentration of the pea protein isolate is higher than skimmed milk powder, total solids (TS) were adjusted by addition of maltodextrin DE 38-41 (Roquette, France), in order to achieve 13% TS, as an average full fat milk. Sunflower high oleic oil (Oleificio Sabo, Switzerland) has been used to replace milk fat. At a 26% TS the system has been formulated with 6.6% total protein (4.95% milk protein, 1.65% pea protein) and 1% oil.

Table 5 shows the composition of the milk-pea system.

TABLE 5

Main ingredients and exemplary recipe of a mixed 75:25 MSK-pea protein system 26% TS.

| Ingredient | TS (%) | Protein (%) | Quantity (%) |
|---|---|---|---|
| | | | 26% TS |
| MSK, low heat | 96.4 | 34.3 | 15.0 |
| Pea protein isolate | 93.0 | 85.9 | 2.1 |
| Sunflower, high oleic | 100.0 | | 1.0 |
| Maltodextrin, DE 38-41 | 95.7 | | 9.3 |
| Water | | | 72.7 |

For calcium addition, calcium lactate (Purac Biochem, the Netherlands) was dry mixed and added together with the maltodextrin during the process.

FIG. 10 shows the process used to formulate the milk-pea systems.

The pea protein was pre-treated and the milk-pea system was formulated and processed as indicated in Example 1.

Flow Properties

With the non-heated and heated emulsions, flow experiments were performed as in Example 1.

Particle Size Distribution

The particles size distribution was analysed as in Example 1.

Ionic (Free Calcium) Determination

Ionic calcium concentration was measured as indicated in Example 1.

Results

TABLE 6

| Added mineral | CaLac (mM) | Target pH | pH at 25° C. before heating | Free calcium (mM) | D (4, 3) (μm) before | D (4, 3) (μm) after | Viscosity (mPa·s at 100 1/s) before | Viscosity (mPa·s at 100 1/s) after |
|---|---|---|---|---|---|---|---|---|
| Yes | 2.5 | 6.7 | 6.59 | 1.5 | 0.629 | 3.707 | 9 | 11 |
| Yes | 2.5 | 6.4 | 6.35 | 2.2 | 0.753 | 27.851 | 10 | 23 |
| Yes | 2.5 | 6.3 | 6.31 | 2.4 | 0.724 | 28.01 | 11 | 28 |
| Yes | 2.5 | 6.2 | 6.20 | 2.4 | 0.785 | 22.877 | 13 | 30 |

Table 6 shows that the emulsion with calcium lactate had a free ionic calcium value of 1.5 mM at pH 6.59, which is comparable to the value observed in the full-fat system. Under these conditions (pH 6.59, free calcium concentration of 1.5 mM) significant protein aggregation was not induced during heat treatment. With decreasing pH the free calcium increased up to 2.4 mM at pH 6.20 and both particle size and viscosity increased after heating the emulsions. The effect on viscosity increase is higher at lower pH. By adding calcium lactate and decreasing pH, in a reduced fat system it was possible to achieve similar or even higher viscosities than those of the full fat system (16 mPa·s at 100 1/s) without added calcium.

Example 4

Milk Protein and Pea Protein Aggregates Obtained by Calcium Lactate Addition in Double Concentrated Recombined Skimmed Milk, where 25% of the Milk Protein have been Substituted by Pea Proteins Skim milk powder (MSK) low heat was provided by Hochdorf (Switzerland) and pea protein isolate Nutralys XF was provided by Roquette (France). Since the protein concentration of the pea protein isolate is higher than skimmed milk powder, total solids (TS) were adjusted by addition of maltodextrin DE 38-41 (Roquette, France), in order to achieve 13% TS, as an average full fat milk. Sunflower high oleic oil (Oleificio Sabo, Switzerland) has been used to replace milk fat. At a 26% TS the system has been formulated with 6.6% total protein (4.95% milk protein, 1.65% pea protein) and without any fat addition.

Table 5 shows the composition of the milk-pea system.

TABLE 7

Main ingredients and exemplary recipe of a mixed 75:25 MSK-pea protein system 26% TS.

| Ingredient | TS (%) | Protein (%) | Quantity (%) |
|---|---|---|---|
| | | | 26% TS |
| MSK, low heat | 96.4 | 34.3 | 15.0 |
| Pea protein isolate | 93.0 | 85.9 | 2.1 |
| Maltodextrin, DE 38-41 | 95.7 | | 10.3 |
| Water | | | 72.6 |

For calcium addition, calcium lactate (Purac Biochem, the Netherlands) was dry mixed and added together with the maltodextrin during the process.

FIG. 10 shows the process used to formulate the milk-pea systems.

The pea protein was pre-treated and the milk-pea system was formulated and processed as indicated in Example 1.

Flow Properties

With the non-heated and heated emulsions, flow experiments were performed as in Example 1.

Particle Size Distribution

The particles size distribution was analysed as in Example 1 but with a measurement setting used refractive index was 1.52 for proteins.

Ionic (Free Calcium) Determination

Ionic calcium concentration was measured as indicated in Example 1.

Results

TABLE 8

| Added mineral | CaLac (mM) | Target pH | pH at 25° C. before heating | Free calcium (mM) | D (4, 3) (μm) before | D (4, 3) (μm) after | Viscosity (mPa·s at 100 1/s) before | Viscosity (mPa·s at 100 1/s) after |
|---|---|---|---|---|---|---|---|---|
| Yes | 2.5 | 6.7 | 6.69 | 1.5 | 0.551 | 3.273 | 9 | 10 |
| Yes | 2.5 | 6.3 | 6.26 | 2.2 | 0.612 | 33.587 | 9 | 30 |
| Yes | 2.5 | 6.2 | 6.20 | 2.5 | 0.769 | 32.362 | 11 | 27 |
| Yes | 2.5 | 6.1 | 6.03 | 2.8 | 1.145 | 24.719 | 15 | 29 |

Table 8 shows that the protein dispersion with added calcium lactate had a free ionic calcium value of 1.5 at pH 6.69, which is comparable to the value observed in the full-fat and reduced fat system. Under these conditions (pH 6.69, free calcium concentration of 1.5 mM) significant protein aggregation was not induced during heat treatment. In the protein dispersion at decreasing pH the free calcium increased up to 2.8 mM at pH 6.03 and both particle size and viscosity increased after heating the protein dispersions. The effect on viscosity increase is higher at lower pH. By adding calcium lactate and decreasing pH, in a system without fat it was possible to achieve similar or even higher viscosities than those of the full fat system (16 mPa·s at 100 1/s) without added calcium.

Example 5

Calcium Chloride Addition in Milk Protein Concentrate (MPC)/Soy Protein Isolate (SPI) Stabilized Emulsions at Laboratory Scale Material and Methods Preparation of MPC Dispersion The stock solution of micellar caseins dispersion was prepared at a protein concentration of 10 wt %. Milk Protein Concentrate enriched in micellar caseins Promilk852B was purchased from Ingredia (Arras, France). The powder composition was (g/100 g wet powder): protein (Nx6.38) 82.3, Ca 2.6, Mg 0.1, Na 0.07, K 0.29, Cl 0.05, P 1.56. The mass of powder needed to prepare the dispersion was calculated as a function of the protein content in the powder.

MPC powder was hydrated in MilliQ water for 3 hours under stirring at the room temperature. After 3 hours, the protein dispersion was homogenized with an EmulsiFlex C-5 high pressure, single-stage homogenizer (Avestin®, Canada). This treatment decreased the average particle size of micellar caseins, it allows to stabilize the dispersion and avoids the sedimentation of the MPC.

The z-average hydrodynamic radius of the casein micelles was determined after the homogenization using a Nanosizer ZS apparatus (Malvern Instruments®, UK) and it was around 200-250 nm. The corresponding polydispersity index was below 0.2 indicating that the sample exhibited a monodispersed particle size distribution.

Preparation of SPI Dispersion

To improve the solubility of the soy protein, the soy proteins were extracted from non GMO soy flour (Soy Flour 7B IP from ADM, Decatur, Ill., USA; batch 413936) using mild isoelectric precipitation process to minimize protein denaturation. To this aim, soy flour was dispersed in MilliQ water for 90 min under stirring at room temperature. The flour to water ratio was 1:8 (100 g of flour for 800 g of water at pH: 6.7). After dispersion, the pH was adjusted at 7.5 using 1 M NaOH and the dispersion was centrifuged in bottle of 1 liter for 30 min at 9,000 g at room temperature. The supernatant was after collected and the pH was adjusted at 4.8 using 1 M HCL in order to precipitate proteins. Then, the dispersion was centrifuged again at the same conditions as before. After the centrifugation, the precipitate was extracted and grinded with a mortar in order to reduce particle size and improve hydration capacity. Afterward, the precipitate was solubilized in a minimum amount of water as possible (1:4 precipitate/water mass ratio) under stirring at least 10 min and the pH was adjusted to 7.0 by addition of 1 M NaOH. After complete solubilization, the soy protein isolate dispersion was frozen and freeze-dried to obtain a powder. The composition of the powder was (g/100 g wet powder): protein (Nx6.25) 91.3, Ca 0.057, Mg 0.073, Na 1.59, K 0.37, Cl 0.62, P 0.63. It can be noticed that the amount of mineral Na and Cl was rather high due to pH adjustment steps needed for protein extraction. The different fractions of soy proteins were identified by SDS-PAGE electrophoresis, it revealed the presence of both major fractions of soy proteins: 7S and 11S.

The stock dispersion of SPI was prepared at a protein concentration of 10 wt %. SPI were dispersed in MilliQ water for 4 hours at room temperature under stirring. The dispersions were then stored overnight at 4° C. to allow the complete hydration and decrease the foam layer that formed during stirring.

Preparation of the MCI/SPI Mixtures

Dispersions of MCI and SPI prepared as described below were mixed by weight at MPC:SPI ratio of 75:25 and 50:50 upon stirring at room temperature at least 10 min using a magnetic stirrer.

Emulsion Preparation

O/W emulsions were prepared by the addition of high oleic sunflower oil (Oleificio Sabo, Manno, Switzerland) to the proteins dispersions so that total sample resulted in oil content of 2.5, 5 and 10 wt % and a constant protein content of 3 wt % by dilution of the stock dispersions prepared at 10 wt %. The oil/water systems were subsequently pre-homogenized using an Ultra-Turrax T25 basic (IKA®, Switzerland) at 11,000 rpm/min during 1 minute for a volume of 500 mL. The pre-homogenized emulsions were after homogenized at High Pressure with a PandaPLUS HomoGenius 2000 (GEA®, Germany) adjusted at 50 bars for the first valve and at 250 bars for the second one, to obtain a pressure total of 300 bars.

Emulsions were homogenized twice by this method. After homogenization, pH was adjusted to 7.0 by addition of 1M NaOH. For calcium containing samples, the necessary amount of $CaCl_2,2(H_2O)$ was added to the pH 7.0 sample and emulsion was stirred for 1 hour at room temperature. Samples were then heated up at 95° C. during 15 min in a hot water bath adjusted at 97° C. Emulsions were after cooled in iced-water during 20 min and stored at 4° C. during 1 hour.

After cooling, the heat treated emulsions were afterward sheared at 16,000 rpm during 2 min using a Ultra-Turrax T25 basic (IKA®, Switzerland) in a beaker with a volume of 60 mL. Emulsions were after stored at 4° C. until the analyses were done.

Particle Size Distribution

In order to assess particles size distribution, emulsions were analyzed after shearing by dynamic light scattering using a MasterSizer 3000 (Malvern Instruments Ltd®, UK). The emulsion sample was dispersed in the Hydro SM measuring cell until an obscuration rate of 9-10% was obtained. Non-heated and heated samples were analyzed. Measures were performed three times and the average of the three replications was reported.

Microstructure of Protein Aggregates

Cryo-Sectioning of Samples

Cryogenic cuts were done in order to analyze samples by CLSM. To this aim, sucrose and formaldehyde were added at the samples in order to conserve them. Percentage are for the sucrose 30 wt % of the total volume and 3.7 wt % for the formaldehyde. Samples were homogenized using a vortex and stored overnight at 4° C. before beginning analyses. Afterwards, samples were fixed. This step consisted of adding 0.5 g of the sample in 1 g of Optimum Cutting Temperature (OCT) Compound for Cryostat Sectioning, Tissue-Tek®. The composition was homogenized and 0.1 g were added in the cryostat sample holder, itself containing already OCT Compound for Cryostat Sectioning, Tissue-Tek®.

The cryostat sample holder was immersed in a plastic vial containing 80 mL of 2-Methylbutane (99% from Sigma Aldrich®, US), itself immersed in insulated box containing liquid nitrogen. The solution of 2-Methylbutane ensures a good freezing of the sample and protects it from the drying.

Samples were then placed in a Cryostat CM 3050 (Leica®, Switzerland). Microtome cuts were afterwards done at 7 μm of thickness at −21° C. Microscope slides were conserved in a freezer at −20° C. until the analyses were performed.

Microscope slides were previously treated with HistoGrip (50× concentrate from ThermoFisher Scientific®, US) for adhering tissue to glass slides and avoid to remove tissues during harsh processes.

Confocal Scanning Laser Microscopy

Mixed proteins emulsions were analyzed using a specific protein immune-labelling to distinguish between milk and soy proteins. According to Auty (2013), immuno-labelling is more commonly used for proteins and requires a specific antibody to target the proteins of interest, i.e. MPC and SPI. Results of immuno-labelling depend heavily on the specificity of the primary antibody to the target epitope. Heat denaturation could have an impact on the immuno-reactivity of the target protein, especially as proteins undergone a severe heat-treatment in our experiment. This treatment could affect the antibodies specificity and decreased the efficacy of the labelling.

Two-steps immuno-labelling, using a fluorescently labelled secondary antibody to bind to the primary antibody were performed, as this increases the signal-to-noise ratio.

Before using antibodies to detect proteins, the remaining binding surface must be blocked to prevent the non-specific binding of antibodies. Normal goat serum, Invitrogen PCN 5000 (ThermoFisher Scientific®, US) was used as a blocker. 25 μL of normal goat serum were added at 1 mL of antibodies dilutions buffer {Tris 50 mM-NaCl 150 mM-PEG 0.1%-BSA 2.5% pH 8.6}. The preparation was afterwards centrifuged at 4,000 g for 10 min using Eppendorf® centrifuge 5702 (Vaudaux-Eppendorf AGO, Switzerland). Microscope slides were during this time rinsed using milliQ water in order to eliminate the Tissus Tek®. Normal goat serum was applied on the microscope slides during 20 min and rinsed in three staining dishes, two of them were filled with milliQ water and the last one with rinse buffer {Tris 50 mM-NaCl 1.50 M-PEG 1% pH 8.6}. Primary antibodies were prepared in dilution 1:200 for soy antibody and in dilution 1:50 for casein κ antibody. Different dilutions were performed previously in order to choose the more efficient. 20 μL of Rabbit anti-casein κ (Antibodies.Online, US) were added at 1 mL of solution for antibodies dilutions and homogenized using a vortex. The same practical work was done to prepare the soy protein antibody using Chicken Anti-Soy Protein (Antibodies.Online, US) adjusting to the dilution chosen. The two antibodies were mixed together, 1 mL of each one was put in an Eppendorf® tube. Eppendorf® tube was after centrifuged at 4,000 g for 10 min using Eppendorf® centrifuge 5702 (Vaudaux-Eppendorf AG®, Switzerland). Primary antibodies were then put on the microscope slides overnight at 4° C. in humid conditions. After the incubation, microscope slides are rinsed in three staining dishes filled with rinsed buffer, samples were left 10 min in the last one. During this time, secondary antibodies were prepared following the same manipulation as for primary antibodies. Goat Anti-Chicken Igy (H&L), Dylight 488 (Agrisera®, Sweden) and Goat Anti-Rabbit IgY (H&L), Dylight 405 (Agrisera®, Sweden) were used as secondary antibodies. Secondary antibodies were put on the microscope slides for 1 hour and rinsed in three staining dishes filled with MilliQ water.

In order to visualize oil droplets, microscope slides were also dyed with the Nile Red solubilized in ethanol, for 10 min and rinsed in MilliQ water. Slides were then mount with a set mounting Vectashield Hard Set Mounting Medium (Vector Laboratories®, US).

Microscope slides were after analyzed using a Zeiss® LSM 710 Confocal Scanning Microscope (Zeiss®, Germany). A 10×/ 0.45∞/ 0.17/PL APO and a 63×/1.4 oil/DIC 420782-9900/PL APO was used for all images.

Saturation control allows to check the specificity of primary antibody for the protein and ensure that the secondary antibody is specific to the first one. For this purpose, proteins were added in the quantity of 2.5 μL/mL to the preparation of primary antibody. If the primary antibody and the secondary are specific, one shouldn't have a signal and background at CLSM. The control of the Nile Red spectral emission was also done in order to ensure that each spectral emission are enough separated to avoid superposition.

Flow Properties

One day after shearing, flow experiments were performed using a controlled stress rheometer Physica MCR501 (Anton Paar®, Austria) with concentric cylinders geometry CC27-SS/S (diameter=27 mm, gap=1.14 mm by Anton Paar®, Austria).

Steady state flow measurements were conducted in a constant temperature of 25° C., a shear stress of 100 1/s was applied to the samples during 5 min, following by four shear rates, one from 0.1 to 500 1/s and one other from 500 to 0.1 1/s, these were done twice; 15 measurements each 30 s were done. The apparent viscosity was recorded as a function of the shear rate.

For each measurement, an aliquot (19 mL) of the emulsion sample was poured into the cup. Measures were performed three times and the average of the three replications was reported.

Soluble Protein Content

In order to characterize content in soluble proteins in the products from the invention, emulsions were centrifuged at 16,000 g at room temperature for 20 min using an Eppendorf® centrifuge 5418 (Vaudaux-Eppendorf AG®, Switzerland), one day after production. Supernatant was carefully withdrawn and stored at 4° C. in order to be analyzed by Reverse Phase-Ultra Performance Liquid Chromatography (RP-UPLC).

The UPLC system (Waters Corp Milford Mass., USA) consisted of a binary pump, a temperature controlled autosampler (sample manager-UPSMPM6R) and a photodiode array detector (UPPDA-E). The equipment was controlled by the Empower® 3 software, Pro version.

Separations were performed on a reversed-phase analytical column Acquity UPLC® BEH300 C4 1.7 µm 2.1×150 mm (Waters Corp Milford Mass., USA) and on VANGUARD™ Pre-column BEH300 C4 1.7 µm 2.1×5 mm (Waters Corp Milford Mass., USA). UPLC vials were kept at constant temperature 8° C.±2° C. and injected by the sample manager system. A 500 µL injection syringe and a 250 µL injection loop were used.

Standards of caseins and soy proteins were prepared at concentrations of 0.1, 0.3, 1, 3, and 5 wt % by dilution in milliQ water from a 10 wt % reference solution. In a 1.5 mL Eppendorf® microtube, 200 µL of the sample and 800 µL of buffer {Guanidine-HCl 7.5 M; Trisodium Citrate 6.25 mM; DTT 23 mM} were added. The sample's and buffer's masses were accurately weighted. The composition was then homogenized using a vortex and incubated in an Eppendorf® Thermomixer Compact (Vaudaux-Eppendorf AGO, Switzerland) at 60° C. for 10 min at 650 rpm.

After incubation, samples were homogenized and centrifuged at 16,000 g for 10 min at room temperature using Eppendorf® centrifuge 5418 (Vaudaux-Eppendorf AGO, Switzerland). Supernatant was then carefully withdrawn and introduced in a UPLC Vial, watching out for the fat layer and also to not suspend the pellets if presents. The injection volume was variable from 30 µL to 150 µL, adapted to the sample's protein content (determined by Kjeldahl method, Nx6.38) to have sufficient signal. The standards were also injected with adjusted volumes in order to consider variability.

A gradient elution was carried out with two solvents mixed during the elution. Solvent A consisted of 0.1% TFA in water and solvent B was 0.1% TFA in acetonitrile/water (90/10) (v:v). Separations were performed with a linear gradient from 15 to 35% B in 4 min (5% B/min), 35 to 47% B in 24 min (0.5% B/min) and from 47% B to 80% B in 4 min (8.25% B/min). This was followed by an isocratic elution at 80% B during 1 min. Then returned linearly to the starting condition in 2 min, followed by the rebalance of the column for 5 min.

The flow rate was 0.6 mL.min-1 and the column temperature was kept constant at 40±1° C. The acquisition was achieved at λ=214 nm (resolution 2.4 nm–20 points/sec–Exposure time automatic).

Each chromatogram was manually integrated. For calibration curves, the total area was plotted as a function of proteins amount injected. The soluble protein content was calculated from the ratio of protein amount present in the supernatant after centrifugation and the total amount of protein present in the emulsion without centrifugation and expressed in percentage.

Results

Particle Size Distribution

FIGS. 1A, B and C shows that upon heat treatment and shearing at 75:25 MPC:SPI ratio, the size distribution of the emulsions at pH 7.0 exhibit a peak around 400-600 nm for the 3 sunflower oil content tested (2.5, 5 and 10 wt %). On the contrary, larger particles are formed when the heat treatment in achieved in presence of 5 mM added free calcium. Hence, there is a clear shift of the peak of the size distribution to around 10-25 microns, indicating that the initial oil droplets had aggregated into larger protein based particles.

Figure 2:
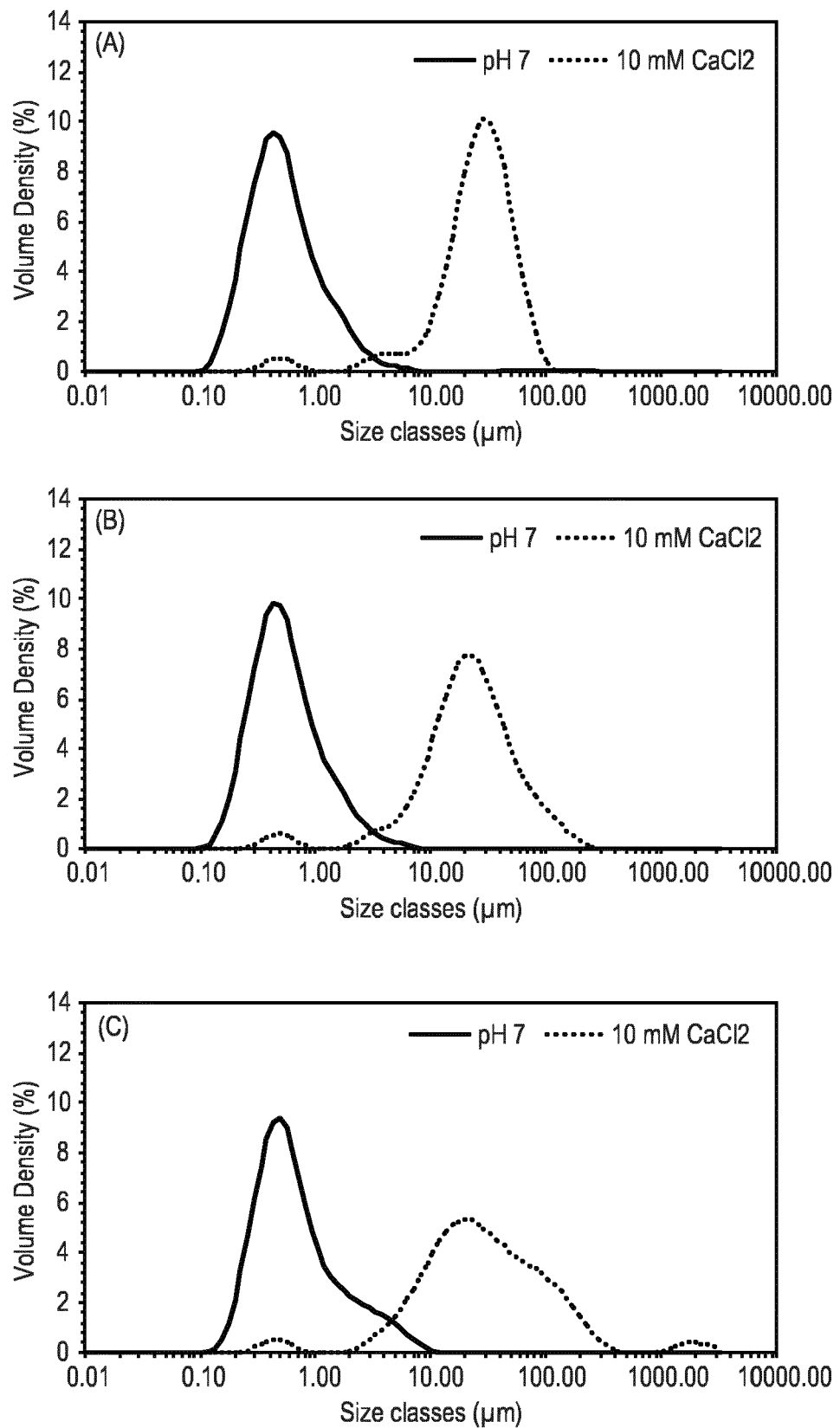
FIG. 2 shows particle size distributions of high oleic sunflower based emulsions stabilized by milk protein concentrate/soy protein isolate at a total protein content of 3 wt % and a mixing ratio 50/50 after heating (95° C., 15 min) and shearing at pH 7.0 in the presence or absence of 10 mM $CaCl_2$. (A) 2.5 wt % sunflower oil, (B) 5 wt % sunflower oil, (C) 10 wt % sunflower oil. Full line: pH 7.0 without $CaCl_2$ added; dashed line: pH 7.0 with 10 mM $CaCl_2$ added.

FIGS. 2A, B and C shows that upon heat treatment and shearing at 50:50 MPC:SPI ratio, the size distribution of the emulsions at pH 7.0 exhibit a peak around 400-600 nm for the 3 sunflower oil content tested (2.5, 5 and 10 wt %). On the contrary, larger particles are formed when the heat treatment in achieved in presence of 10 mM added free calcium. Hence, there is a clear shift of the peak of the size distribution to around 10-25 microns, indicating that the initial oil droplets had aggregated into larger protein based particles.

Microstructure and Soluble Protein Content

Figure 3:
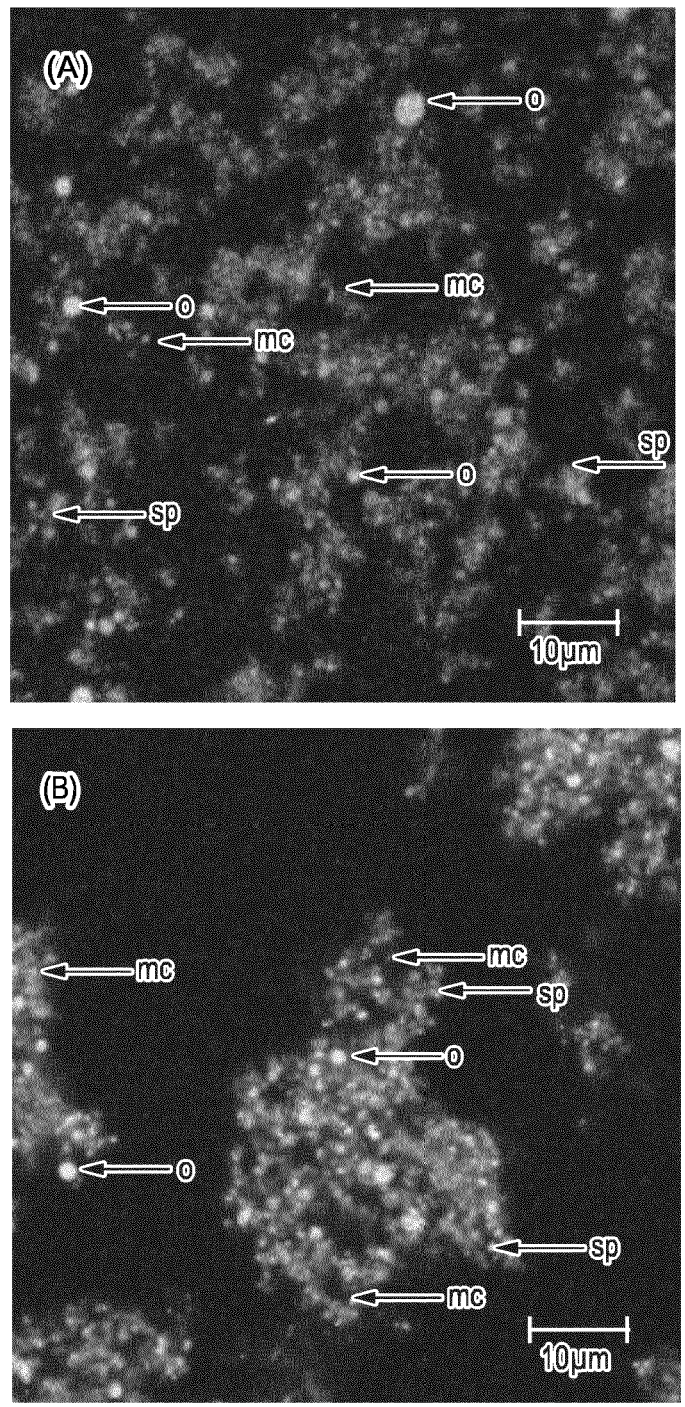
FIG. 3 shows confocal scanning laser micrographs of 3 wt % milk protein concentrate/soy protein isolate at 75/25 mixing ratio stabilized 5 wt % high oleic sunflower emulsion after heat treatment and shearing at 95° C. for 15 min. (A) pH 7.0 without $CaCl_2$ added; (B) pH 7.0 with 5 mM $CaCl_2$ added. Scale bar is 10 microns. mc stands for micellar caseins, sp for soy proteins and o for oil droplets next to arrows.
Figure 4:
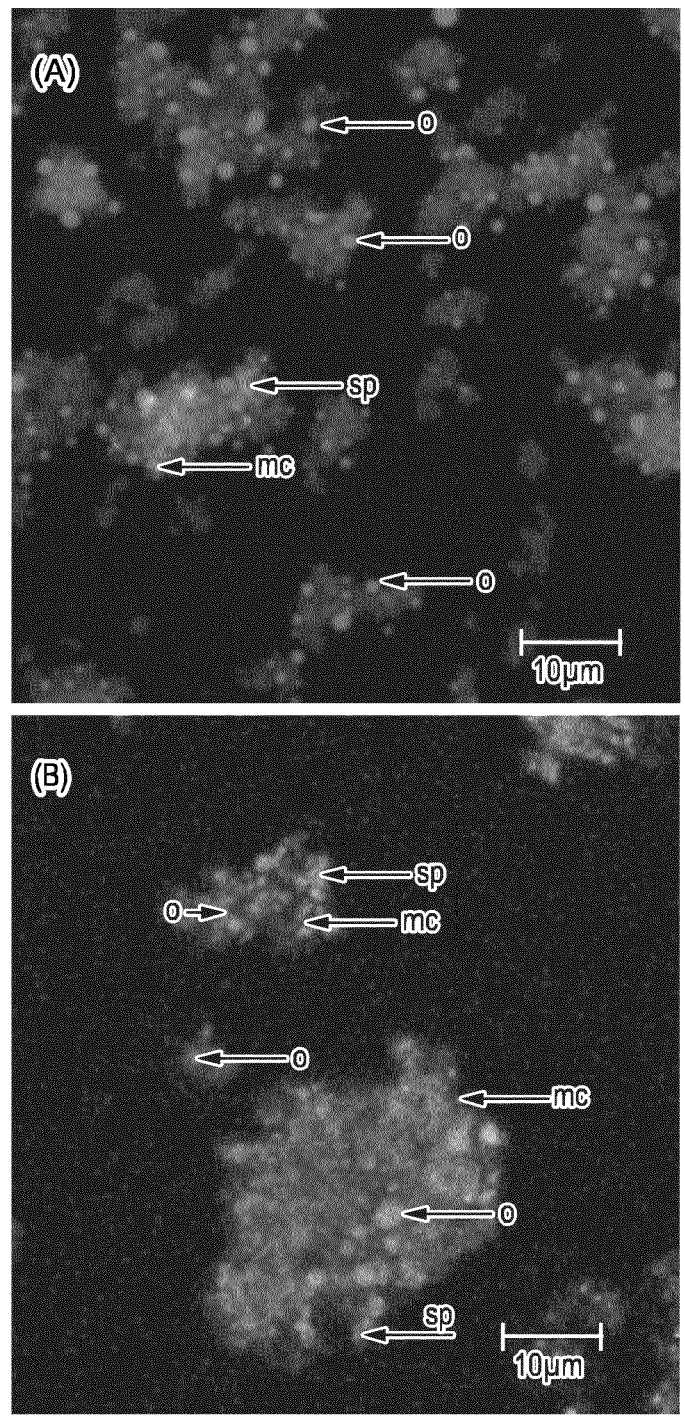
FIG. 4 shows confocal scanning laser micrographs of 3 wt % milk protein concentrate/soy protein isolate at 50/50 mixing ratio stabilized 5 wt % high oleic sunflower emulsion after heat treatment and shearing at 95° C. for 15 min. (A) pH 7.0 without $CaCl_2$ added; (B) pH 7.0 with 10 mM $CaCl_2$ added. Scale bar is 10 microns. mc stands for micellar caseins, sp for soy proteins and o for oil droplets next to arrows.

The microstructure of the protein based aggregates of this invention is clearly shown on FIGS. 3 (75:25 ratio) and 4 (50:50) for emulsions containing 5 wt % high oleic sunflower oil. FIG. 3A shows for 75/25 MPC/SPI ratio that small connected aggregates were obtained around well-defined oil droplets. The labelling of both MPC and SPI shows that proteins were not closely located in the aggregates as both specific labelling could be easily discriminated. The amount of soluble proteins was about 97% indicating that only a small fraction of both protein sources were participating to aggregate formation. On the contrary, larger and more compact particles were obtained in presence of 5 mM calcium (FIG. 3B). Oil droplets were less visible and strongly embedded in the aggregate structure. MPC and SPI labelling were located inside the particles, indicating that they were spatially very close. The amount of soluble proteins in this sample was less 4%, showing that the majority of the MPC and SPI were involved into the aggregated structure. FIG. 4 presents micrographs of MPC/SPI mixtures at 50/50 weight ratio in the presence of 10 mM $CaCl_2$. In the absence of added free calcium (FIG. 4A), small aggregates exhibiting numerous discrete oil droplets embedded were seen. With added $CaCl_2$, the oil droplets were much more embedded in larger protein aggregates where both MPC and SPI were involved as can be seen with the co-labelling of the two protein sources (FIG. 4B). The amount of soluble protein at pH 7.0 was found to be about 85.9% as measured by UPLC. This indicates that most of the proteins were not participating to the aggregated structures. In presence of calcium chloride, the amount of soluble proteins dropped drastically to reach 13.4%, indicating that the majority of the protein were part of the aggregates, contributing therefore to form larger particles.

Flow Properties and Shear Viscosity

Figure 5:
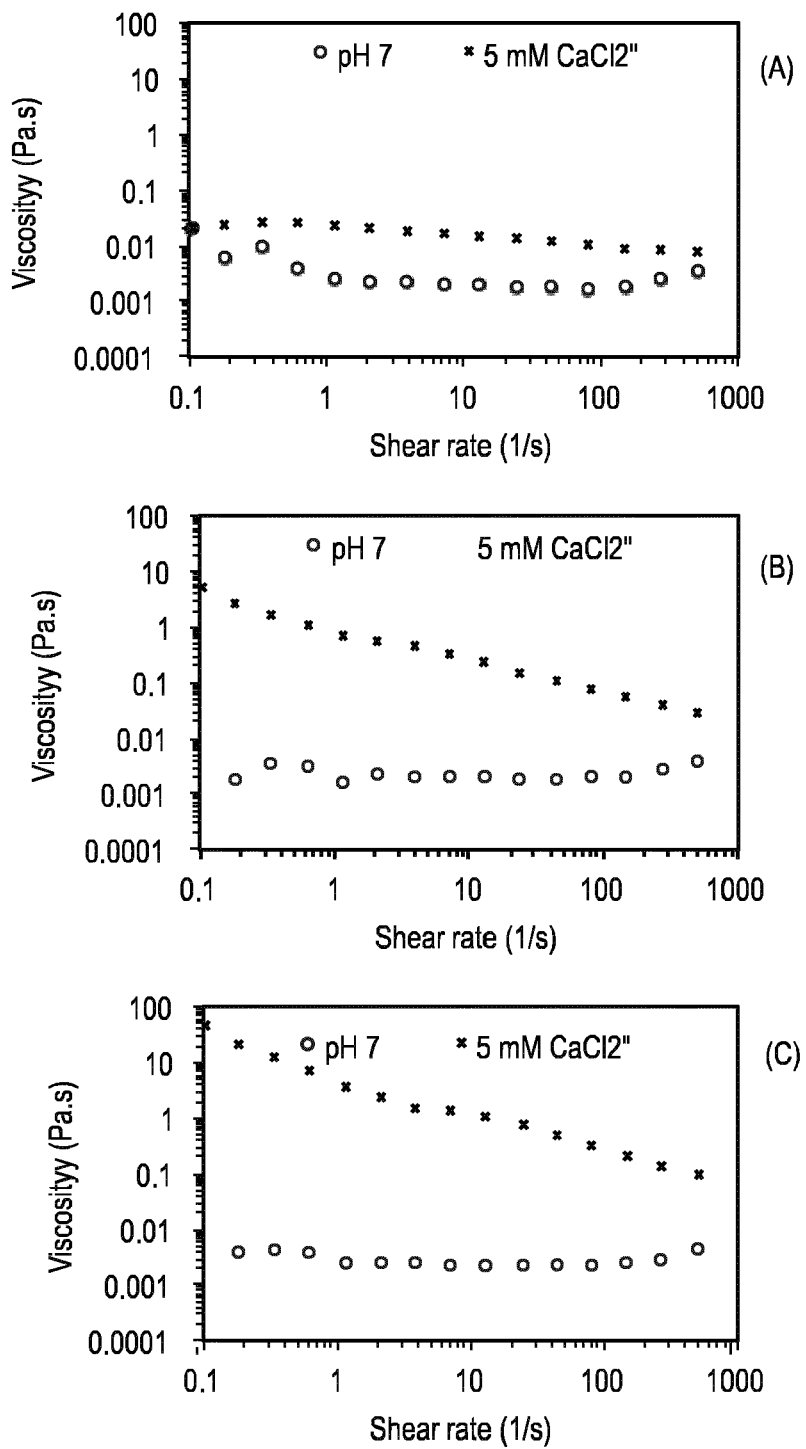
FIG. 5 shows flow curves at 20° C. for 3 wt % milk protein concentrate/soy protein isolate mixture at 75/25 mixing ratio stabilized high oleic sunflower emulsion after heat treatment and shearing at 95° C. for 15 min at pH 7.0 in the presence or absence of 5 mM $CaCl_2$. (A) 2.5 wt % sunflower oil, (B) 5 wt % sunflower oil, (C) 10 wt % sunflower oil. Circles: pH 7.0 without $CaCl_2$ added; Crosses: pH 7.0 with 5 mM $CaCl_2$ added.
Figure 6:
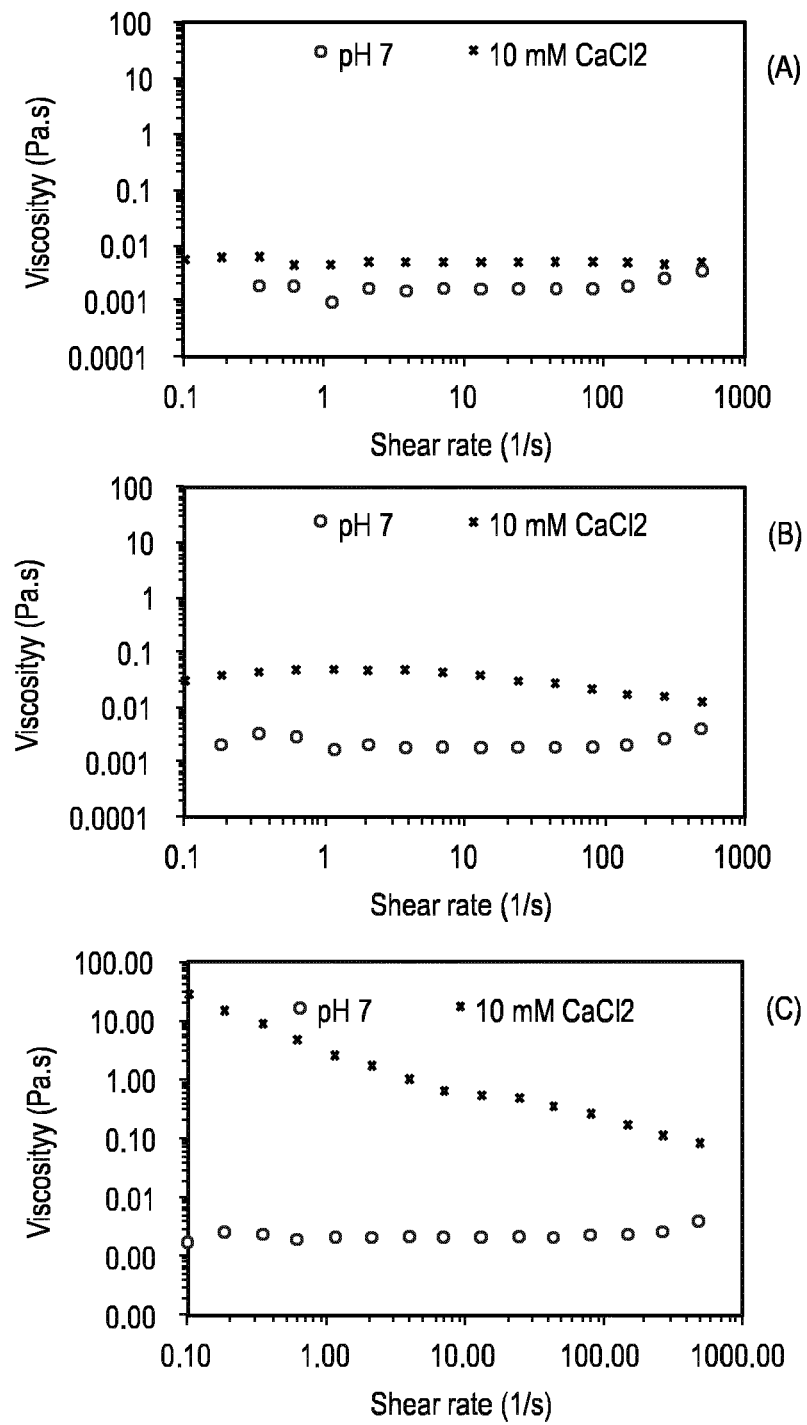
FIG. 6 shows flow curves at 20° C. for 3 wt % milk protein concentrate/soy protein isolate mixture at 75/25 mixing ratio stabilized high oleic sunflower emulsion after heat treatment and shearing at 95° C. for 15 min at pH 7.0 in the presence or absence of 5 mM $CaCl_2$. (A) 2.5 wt % sunflower oil, (B) 5 wt % sunflower oil, (C) 10 wt % sunflower oil. Circles: pH 7.0 without $CaCl_2$ added; Crosses: pH 7.0 with 10 mM $CaCl_2$ added.

The flow curves of MPC/SPI mixtures with different high oleic sunflower oil content are shown on FIGS. 5 and 6. FIG. 5 shows that for the 75/25 mixing ratio, the addition of calcium chloride promoted a shear thinning behaviour and that this effect was increased with the content of oil in the initial mixture (FIGS. 5A, B and C). Interestingly, the system at pH 7.0 in the absence of calcium chloride exhibited always a lower shear thinning behaviour and was much less affected by the fact content indicating that the proteins structures formed were not able to strongly affect the bulk viscosity of the systems. This was very different for the samples of our invention where clearly calcium chloride addition had promoted protein aggregation leading to particles affecting greatly viscosity and therefore allowing for fat reduction.

Flow data related to the MPC/SPI mixture at weight mixing ratio of 50/50 are presented on FIG. 6. It can be seen as for ratio 75/25 that in presence of 10 mM $CaCl_2$, the curves exhibited a strong shear thinning behaviour that was enhanced by the presence of increasing contents in high oleic sunflower oil (FIGS. 6A, B and C). This confirms that the protein aggregates of the invention were able to occupy more space and were affecting the bulk viscosity which is not the case for the control system at pH 7.0 in the absence of calcium. The emulsion produced at pH 7.0 exhibited a Newtonian flow behaviour with an independence of the viscosity as a function of shear rate. This is explained by the fact that viscosity is mainly driven by the oil volume fraction and that the oil droplets are not interacting.

Figure 7:
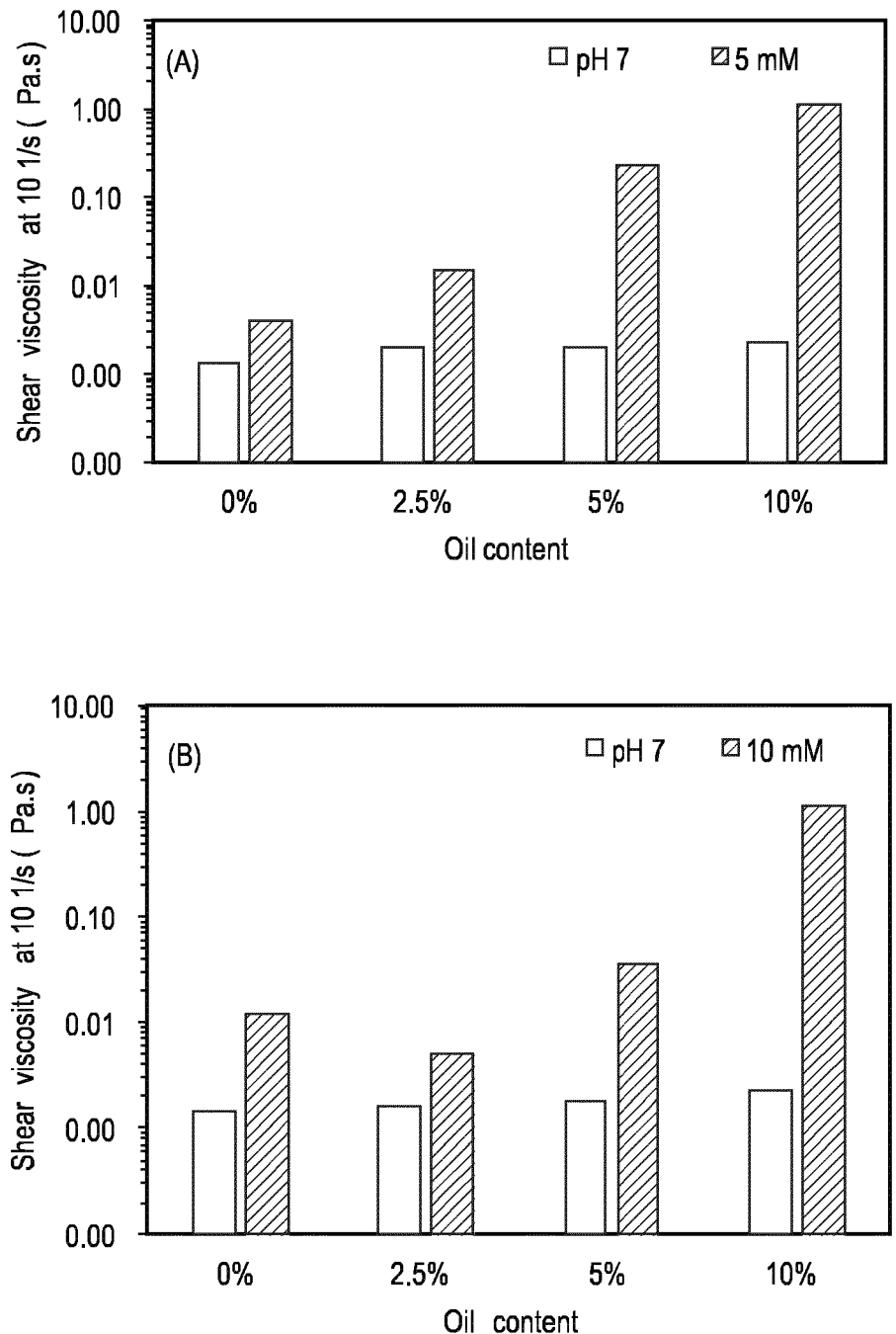
FIG. 7 shows viscosity at a shear rate of 10 1/s for 3 wt % milk protein concentrate/soy protein isolate mixture stabilized high oleic sunflower emulsions after heat treatment and shearing at 95° C. for 15 min at pH 7.0 in the presence or absence of $CaCl_2$. (A) 75/25 MPC/SPI mixing ratio with 5 mM $CaCl_2$ added, (B) 50/50 MPC/SPI mixing ratio with 10 mM $CaCl_2$ added.

FIG. 7 is summarizing the shear viscosity extracted from the flow curves at a shear rate of 10 1/s that is relevant for physiological in-mouth conditions. For both MPC/SPI systems, it is obvious that the addition of oil increases the shear viscosity, but interestingly, the values obtained in the samples of our invention were for both ratios of MPC/SPI higher than the respective controls at pH 7.0 in the absence of $CaCl_2$ added. This shows again the potential of our invention to decrease the fat content while maintaining viscosity and mouthfeel.

Example 6

Calcium Chloride Addition in Milk Protein Concentrate/Soy Protein Isolate Stabilized Emulsions at Pilot Scale The systems tested in example 6 have been reproduced at pilot scale to test the sensitivity of our invention to industrial conditions. The MPC used was similar to example 5, i.e. Promilk852B was purchased from Ingredia (Arras, France). The soy protein isolate was a commercial Profam 974-IP from ADM (Decatur, Ill., USA). It is obtained by isoelectric precipitation of proteins from defatted soybean flour. The protein content in the dry powder was 95.4 wt % while the fat content was 0.6 wt %.

Preparation of the Samples

MCP and SPI dispersions at 3 wt % protein content were prepared in reverse osmosed (RO) water. A batch of 180 kg of MPC was prepared by dispersing under mechanical stirring for 30 min 6.6 kg of MPC powder in 173.4 kg in RO water at 50° C. in a stainless steel tank. For SPI, 2.1 kg of SPI powder was dispersed in 57.9 kg of RO water at 20° C. After 30 minutes, the MPC dispersion was homogenized at 250/50 bars using a high pressure homogenizer. The pH of the MPC and SPI was adjusted at 20° C. to pH 7.0 using 10% hydrochloric acid. The MPC and SPI dispersions adjusted to pH 7.0 were mixed by weight in 40 kg batches to achieve MPC/SPI mixing ratio of 75/25 and 50/50 and were stirred at 20° C. for 30 minutes. High oleic sunflower oil (Oleificio Sabo, Switzerland) was then added to the protein dispersion produce 5 wt % emulsions under high shear. The pre-emulsion was then homogenised at 250/50 bars using a high pressure homogenizer and samples were cooled down to 10° C.

The pH was checked again and in the samples of our invention, the necessary amount of $CaCCl_2 \cdot (H_2O)$ was added to increase the free calcium content 10 mM for the 75 MPC/25 SPI ratio and 20 mM for the 50 MPC/50 SPI ratio. The samples were then heat treated at 95° C. for 3 minutes using a direct steam injection line operating at 180 l/h. The samples were pre-heated at 60° C. for DSI treatment and were then cooled down to 10° C. using a tubular heat exchanger.

The samples were then filled in polypropylene 500 mL bottles and stored at 4° C. for analysis.

Particle Size Distribution

The particle size distribution of the samples were determined as described in example 1. The D(4,3) mean average diameter has been reported for the different samples.

Flow Properties

The flow curves of the samples have been determined as described in example 1. The shear viscosity at 10 s$^{-1}$ has been reported for the samples.

Confocal Scanning Laser Microscopy

The samples were prepared and characterized as described in example 5 except that samples were not cryo-sectionned but imaged in liquid format and that no specific immune-labelling was used to differentiate between MPC and SPI. To this aim, samples were deposed inside a 1 mm deep plastic chamber closed by a glass slide coverslip to prevent compression and drying artefacts. For labelling, Fast green dye (1 wt % in water solution diluted 100 times for use) was used for proteins while Nile Red (0.25 wt % in ethanol, diluted 100 times for use) was used for oil droplets.

Soluble Proteins

The soluble proteins present in the sample was determine by UPLC as described in example 5.

Results

Particle Size, Viscosity and Soluble Proteins

The particle size of the samples of our invention was increased compared to the samples that did not contained added CaCl$_2$ for both MPC/SPI mixing ratios (Table 9). This indicates that the initial oil droplets have aggregated together with the protein to form larger aggregates. The viscosity at 10 1/s was similar or larger than the corresponding control sample showing that the protein aggregates were impacting the bulk viscosity of the samples for a similar oil content in the samples. It should be noted that the flow curves for the samples of our invention exhibited a shear thinning behaviour while for controls these were Newtonian as described in example 5. The soluble protein content was very low in the samples from our invention (less than 3%) while it was larger for the controls (up to 62.2% for the 50/50 ratio). This shows that as described in the previous example, our invention is promoting the majority of the proteins to aggregate with the oil droplets to form larger aggregates which are affecting the bulk viscosity.

TABLE 9

Physicochemical properties of the samples produced at pilot scale.

| MPC/SPI ratio | CaCl$_2$ (mM) | pH at 25° C. before heating | D(4,3) (μm) | Viscosity (mPa · s at 10 1/s) | Soluble proteins (% of total) |
|---|---|---|---|---|---|
| 75/25 | 0 | 7.0 | 6.1 | 7.5 | 35.4 |
| 75/25 | 10 | 6.1 | 32.6 | 7.4 | 2.4 |
| 50/50 | 0 | 7.0 | 2.8 | 4.2 | 62.2 |
| 50/50 | 20 | 5.6 | 21.2 | 15.7 | 2.8 |

Microstructure of the Aggregates

Figure 8:
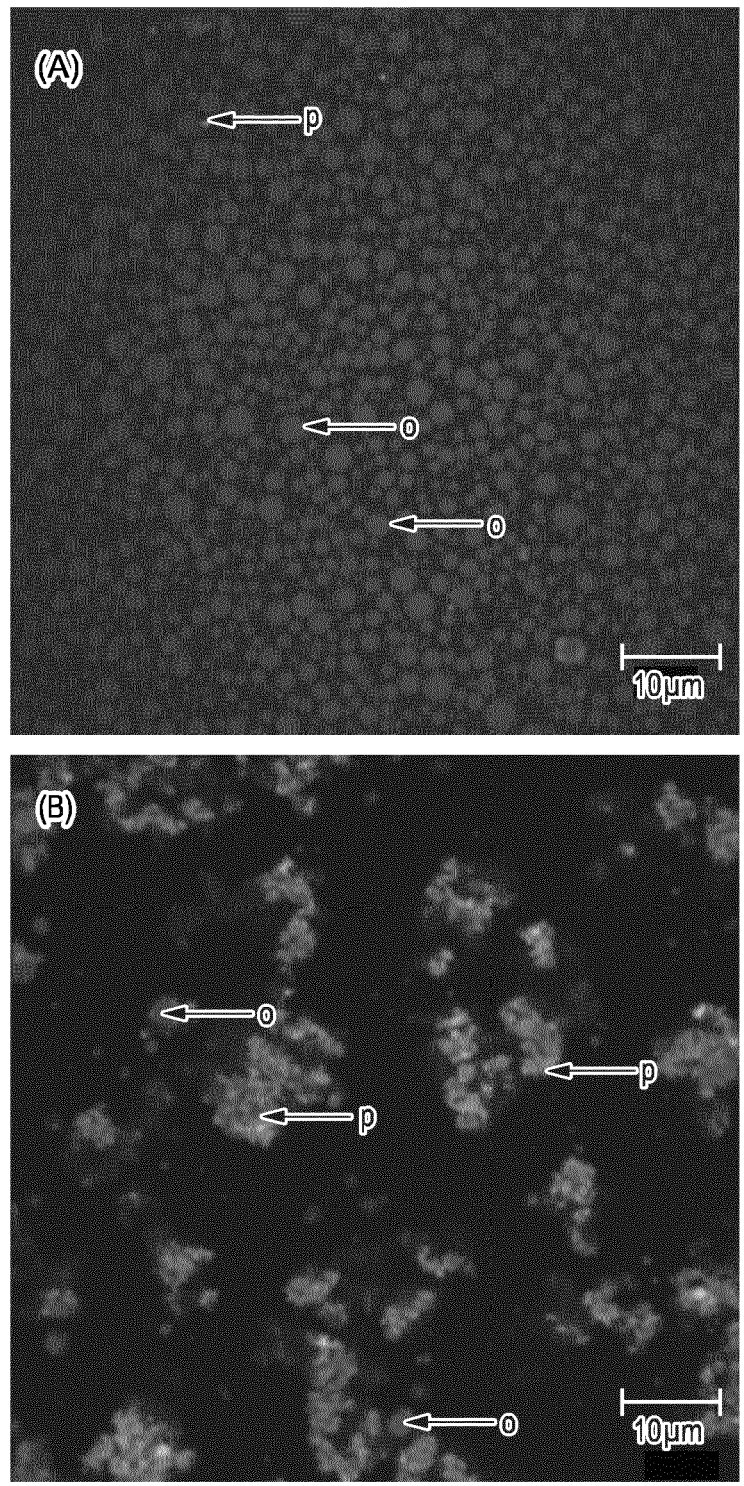
FIG. 8 shows confocal scanning laser micrographs of 3 wt % milk protein concentrate/soy protein isolate at 75/25 mixing ratio stabilized 5 wt % high oleic sunflower emulsion after heat treatment and shearing at 95° C. for 3 min at the pilot plant. (A) pH 7.0 without $CaCl_2$ added; (B) pH 7.0 with 10 mM $CaCl_2$ added. Scale bar is 10 microns. p stands for proteins and o for oil droplets next to arrows.
Figure 9:
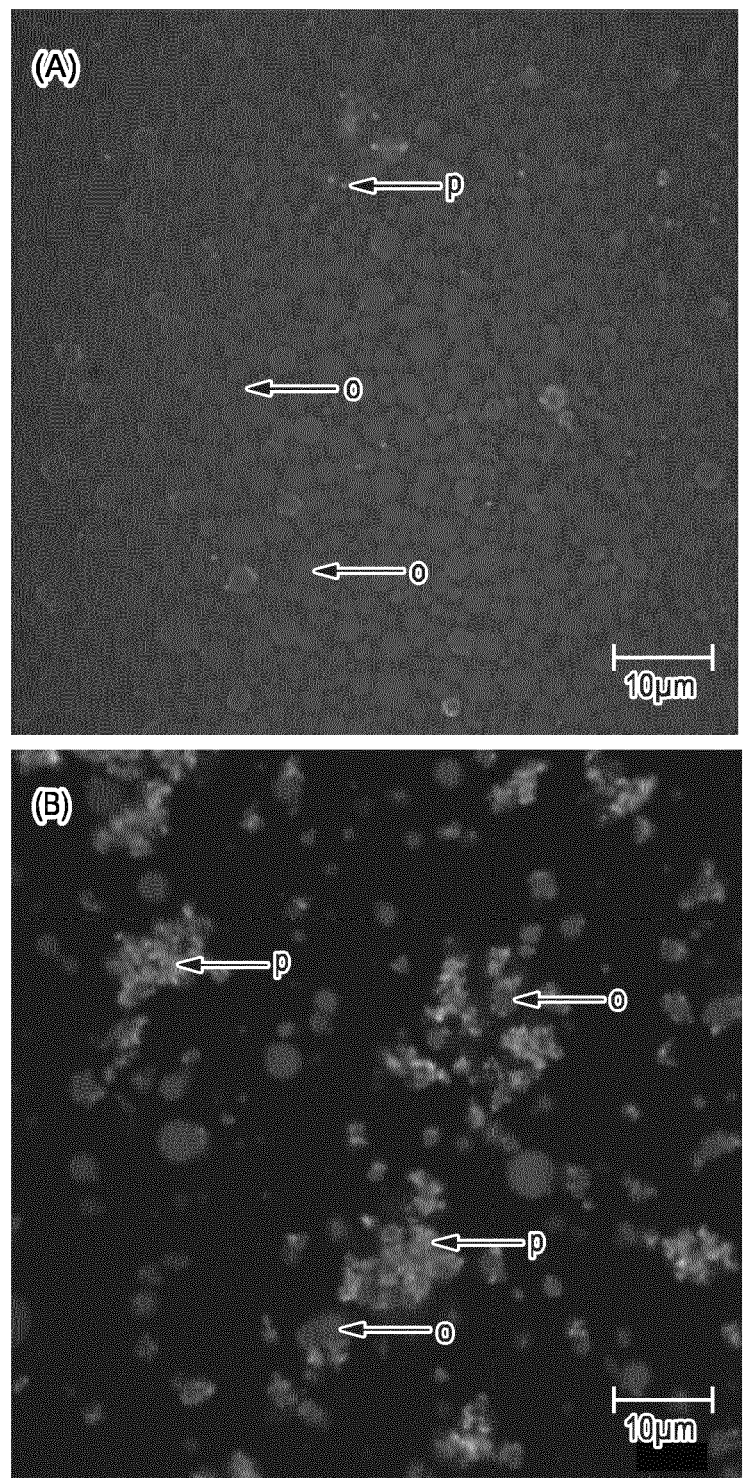
FIG. 9 shows confocal scanning laser micrographs of 3 wt % milk protein concentrate/soy protein isolate at 50/50 mixing ratio stabilized 5 wt % high oleic sunflower emulsion after heat treatment and shearing at 95° C. for 3 min at the pilot plant. (A) pH 7.0 without $CaCl_2$ added; (B) pH 7.0 with 20 mM $CaCl_2$ added. Scale bar is 10 microns. p stands for proteins and o for oil droplets next to arrows.

The structure of the samples was investigated by CSLM (FIGS. 8 and 9). The control samples exhibited a homogenous distribution of oil droplets without marked signed of aggregation for both MPC/SPI mixing ratios (FIGS. 8A and 9A). This is explaining why most of the proteins remained soluble as only a limited fraction was involved in the stabilisation of the interface of the oil droplets. In presence of added CaCl$_2$ for the samples of our invention, the oil droplets had aggregated to form larger aggregates that were embedding oil droplets for both ratios (FIGS. 8B and 9B).

Example 7

Milk Protein and Soy Protein Aggregates Obtained by Calcium Lactate Addition in Double Concentrated Recombined Full Fat Milk, where 50% of the Milk Protein have been Substituted by Soy Proteins Skim milk powder (MSK) low heat was provided by Hochdorf (Switzerland) and soy protein isolate Clarisoy 170 was provided by ADM (Illinois).

Since the protein concentration of the soy protein isolate is higher than skimmed milk powder, total solids (TS) were adjusted by addition of maltodextrin DE 38-41 (Roquette, France), in order to achieve 26% TS. Sunflower high oleic oil (Oleificio Sabo, Switzerland) has been used to replace milk fat.

At a 26% TS the system has been formulated with 6.6% total protein (3% milk protein, 3% soy protein) and 7% oil.

Table 10 shows the composition of the milk-soy system.

TABLE 10

Main ingredients and exemplary recipe of a mixed 50:50 MSK-soy protein system 26% TS.

| Ingredient | TS (%) | Protein (%) | Quantity (%) 26% TS |
|---|---|---|---|
| MSK, low heat | 96.6 | 36.3 | 9.4 |
| Soy protein isolate | 92.0 | 98.2 | 3.7 |
| Sunflower, high oleic | 100.0 |  | 7.0 |
| Maltodextrin, DE 38-41 | 95.7 |  | 7.1 |
| Water | 0.0 |  | 72.8 |

For calcium addition, calcium lactate (Merck, Germany) was dry mixed and added together with the maltodextrin during the process.

FIG. 10 shows the process used to formulate the milk-pea systems.

The soy protein has been treated to improve the solubility and the milk-soy system was formulated and processed as explained in Example 1.

Results

TABLE 11

| Added mineral | CaLac (mM) | Target pH | pH at 25° C. before heating | Free calcium (mM) | D (4, 3) (μm) before | D (4, 3) (μm) after | Viscosity (mPa · s at 100 1/s) before | Viscosity (mPa · s at 100 1/s) after |
|---|---|---|---|---|---|---|---|---|
| no | 0 | 6.7 | 6.75 | 1.8 | 2.58 | 2.881 | 17 | 38 |
| yes | 2.0 | 6.7 | 6.66 | 2.2 | 2.891 | 8.809 | 16 | 75 |
| yes | 2.0 | 6.5 | 6.49 | 2.5 | 2.262 | 18.276 | 17 | 96 |
| yes | 2.0 | 6.4 | 6.39 | 2.9 | 2.069 | 32.542 | 18 | 130 |
| yes | 2.0 | 6.3 | 6.25 | 3.1 | 2.278 | 49.733 | 17.7 | 113 |

Table 11 shows that the emulsion without addition of calcium lactate contained 1.8 mM free ionic calcium in the form of soluble calcium which is not sufficient to induce significant protein aggregation during heat treatment. The addition of calcium lactate to the system was leading to an increase in free ionic calcium. With decreasing pH, the calcium in the system has been progressively released up to 2.9 mM at pH 6.39 and both particle size and viscosity increased after heating the emulsions. The effect on viscosity increase is higher at lower pH.

When the pH has been further decrease to 6.25, the free calcium increased to 3.1, leading to the formation of medium size aggregates (49.733 μm), but however losing some of the viscosity effect compared to pH 6.39. This would indicate that for this specific system a free calcium of 3.1 at a pH of 6.25 is already too high. In order to maximize the viscosity increase lower free calcium and/or higher pH need to be used (e.g. pH 6.39 and 3.1 mM free calcium).

The invention claimed is:

1. A method of producing a food or beverage product, the method comprising:
providing an ingredient composition comprising micellar caseins, whey protein and plant protein, the ingredient composition having a pH of 6.2-6.8, and having a concentration of 1 to 15 wt. % of total proteins, wherein the ingredient composition has a micellar caseins to whey protein ratio of 90/10 to 60/40 and a micellar caseins and whey protein to plant protein ratio of 80/20 to 20/80;
adding a salt comprising divalent cations to the ingredient composition to provide a concentration of 2.0-10 mM free divalent cations in the ingredient composition to form a mixture; and
subsequently heat treating the mixture to form agglomerated proteins comprising micellar caseins, whey protein and plant proteins to produce the food or beverage product, the agglomerated proteins having a size of 5 to 50 microns as measured by D(4,3) mean diameter as measured by laser diffraction.

2. The method according to claim 1, wherein the heat treating of the mixture comprises heat treating at a temperature of 80°-125° C. for a period of 30-900 s or at a temperature of 126° C. or above for 3-45 s.

3. The method according to claim 1, wherein the plant protein is selected from the group consisting of pea protein, soy protein and combinations thereof.

4. The method according to claim 1, wherein the method comprises homogenizing the mixture.

5. The method according to claim 1, wherein the solubility of the plant protein has been improved by the heat treating of the mixture.

6. The method according to claim 1, wherein the agglomerated proteins are 10-40 microns as measured by D(4,3) mean diameter.

7. The method according to claim 1, wherein the divalent cations are selected from the group consisting of $Ca^{2+}$, $Mg^{2+}$, and a combination thereof.

8. The method according to claim 1, wherein the salt is a calcium salt, and the divalent cations are $Ca^{2+}$.

9. The method according to claim 8, wherein the calcium salt is added to the ingredient composition until a free divalent $Ca^{2+}$ concentration is 2.0-6.0 mM.

10. The method according to claim 9, wherein the plant protein is pea protein, and the calcium salt is added to the ingredient composition until the free divalent $Ca^{2+}$ concentration is 2.0-3.0 mM.

11. The method according to claim 9, wherein the plant protein is soy protein, and the calcium salt is added to the ingredient composition until the free divalent $Ca^{2+}$ concentration is 2.0-3.0 mM.

12. The method according to claim 1, wherein a content of soluble protein in the food or beverage product is below or equal to 30% in relation to a total protein content.

13. The method according to claim 1, wherein the ingredient composition comprises from 0 to 36 wt. % fat.

14. The method according to claim 1, comprising adding additional whey proteins to the ingredient composition, wherein the micellar caseins and the whey protein in the ingredient composition are provided in a form selected from the group consisting of raw milk, pasteurized milk, low heat concentrated milk, low heat milk powder, milk protein concentrate, milk protein isolate in liquid or powder form or a combination thereof; and the additional whey proteins are provided in a form selected from the group consisting of sweet dairy whey, whey protein concentrates, whey protein isolates in liquid, concentrate or powder form and combinations thereof.

15. The method according to claim 1, wherein the ingredient composition comprises 2 to 9 wt. % of total proteins.

16. The method according to claim 4, wherein the solubility of the plant protein has been improved by the heat treating and the homogenizing of the mixture.

17. The method according to claim 1, wherein the ingredient composition comprises from 5 to 10 wt. % fat.

18. The method according to claim 1, wherein the heat treating of the mixture comprises heat treating at a temperature of 80°-100° C. for a period of 0.5-4 minutes or at a ultra high temperature (UHT) of at least 135° C. for 3-45 seconds.

* * * * *